US009274283B1

United States Patent
Ellis-Monaghan et al.

(10) Patent No.: US 9,274,283 B1
(45) Date of Patent: Mar. 1, 2016

(54) SILICON PHOTONICS ALIGNMENT TOLERANT VERTICAL GRATING COUPLERS

(71) Applicant: International Business Machines Corporation, Armonk, NY (US)

(72) Inventors: John J. Ellis-Monaghan, Grand Isle, VT (US); William M. J. Green, Astoria, NY (US); Jens Hofrichter, Gattikon (CH); Marwan H. Khater, Astoria, NY (US); Jessie C. Rosenberg, Mount Vernon, NY (US); Steven M. Shank, Jericho, VT (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 0 days.

(21) Appl. No.: 14/501,720

(22) Filed: Sep. 30, 2014

(51) Int. Cl.
| | |
|---|---|
| *G02B 6/34* | (2006.01) |
| *G02B 6/132* | (2006.01) |
| *G02B 6/30* | (2006.01) |
| *G02B 6/12* | (2006.01) |

(52) U.S. Cl.
CPC ........... *G02B 6/34* (2013.01); *G02B 6/132* (2013.01); *G02B 6/30* (2013.01); *G02B 2006/12107* (2013.01)

(58) Field of Classification Search
None
See application file for complete search history.

(56) References Cited

U.S. PATENT DOCUMENTS

| | | | |
|---|---|---|---|
| 7,162,124 B1 * | 1/2007 | Gunn, III | G02B 6/30 385/27 |
| 7,218,826 B1 | 5/2007 | Gunn, III et al. | |
| 7,929,815 B2 | 4/2011 | Hofrichter et al. | |

(Continued)

FOREIGN PATENT DOCUMENTS

EP    2634605 A1    9/2013

OTHER PUBLICATIONS

R. Waldhausl et al., "Efficiency Focusing Polymer Waveguide Grating Couplers", Electronics Letters, 33(7), p. 623-624, (1997).

(Continued)

*Primary Examiner* — Rhonda Peace
(74) *Attorney, Agent, or Firm* — Gibb & Riley, LLC

(57) ABSTRACT

Disclosed are optoelectronic integrated circuit structures that incorporate a first optical waveguide, having a semiconductor core, indirectly coupled to a grating coupler through a second optical waveguide, having a dielectric core, in order provide a relatively large alignment tolerance. The dielectric core can comprise multiple dielectric layers above one end of the semiconductor core and extending laterally over an isolation region adjacent to that end. The grating coupler can include dielectric fins above the isolation region. Alternatively, the grating coupler can include semiconductor fins within the isolation region. Also disclosed herein are methods of forming such optoelectronic integrated circuit structures that can be readily integrated with complementary metal oxide semiconductor (CMOS) device processing and germanium photodetector processing.

25 Claims, 23 Drawing Sheets

(56) References Cited

U.S. PATENT DOCUMENTS

| | | | |
|---|---|---|---|
| 8,064,745 B2* | 11/2011 | Fortusini | G02B 6/34 385/129 |
| 8,520,991 B2 | 8/2013 | Hofrichter et al. | |
| 8,604,577 B2 | 12/2013 | Koch | |
| 8,639,073 B2* | 1/2014 | Pelletier | G02B 6/30 385/37 |
| 8,693,816 B2* | 4/2014 | Kopp | G02B 6/12007 385/14 |
| 8,750,654 B2 | 6/2014 | Dupuis et al. | |
| 2009/0154871 A1* | 6/2009 | Pyo | G02B 6/124 385/14 |
| 2010/0202738 A1* | 8/2010 | Kopp | G02B 6/30 385/90 |
| 2011/0142395 A1* | 6/2011 | Fortusini | G02B 6/34 385/37 |
| 2012/0250007 A1 | 10/2012 | Na et al. | |
| 2013/0279844 A1 | 10/2013 | Na et al. | |
| 2014/0205234 A1 | 7/2014 | Rong et al. | |
| 2015/0309261 A1* | 10/2015 | Kobyakov | G02B 6/30 385/14 |

OTHER PUBLICATIONS

D. Taillaert et al., An Out-of-Plane Grating Coupler for Efficient Butt-Coupling Between Compact Planar Waveguides and Single-Mode Fibers, IEEE Journal of Quantum Electronics, 38(7), p. 949-955, (2002).

D. Taillaert, "Compact Efficient Broadband Grating Coupler for Silicon-on-Insulator Waveguides", Optics Letters, 29(23), pp. 2749-2751 (2004).

V. Laere et al., "Compact and Highly Efficient Grating Couplers Between Optical Fiber and Nanophotonic Waveguides", Journal of Lightwave Technology, 25(1), pp. 151-156 (2007).

J. Hofrichter et al., "Grating Couplers as Optical Probe Pads in a Standard CMOS Process", IEEE Group IV Photonics Conference London (UK), Poster P1.24, pp. 127-129 (2011).

Csutak et al., "CMOS-Compatible Planar Silicon Waveguide-Grating-Coupler Photodetectors Fabricated on Silicon-on-Insulator (SOI) Substrates", IEEE Journal of Quantum Electronics, vol. 38, No. 5, 2002, pp. 477-480.

Wang et al., "Embedded Slanted Grating for Vertical Coupling Between Fibers and Silicon-on-Insulator Planar Waveguides", IEEE Photonics Technology Letters, vol. 17, No. 9, 2005, pp. 1884-1886.

Li et al., "Diffractive Grating Based Out-of-Plane Coupling between Silicon Nanowire and Optical Fiber", CLEO/Pacific Rim, Shanghai, China, IEEE, 2009, pp. 1-2.

Li et al., "Reflectionless Tilted Grating Couplers With Improved Coupling Efficiency Based on a Silicon Overlay", IEEE Photonics Technology Letters, vol. 25, No. 13, 2013, pp. 1195-1198.

* cited by examiner

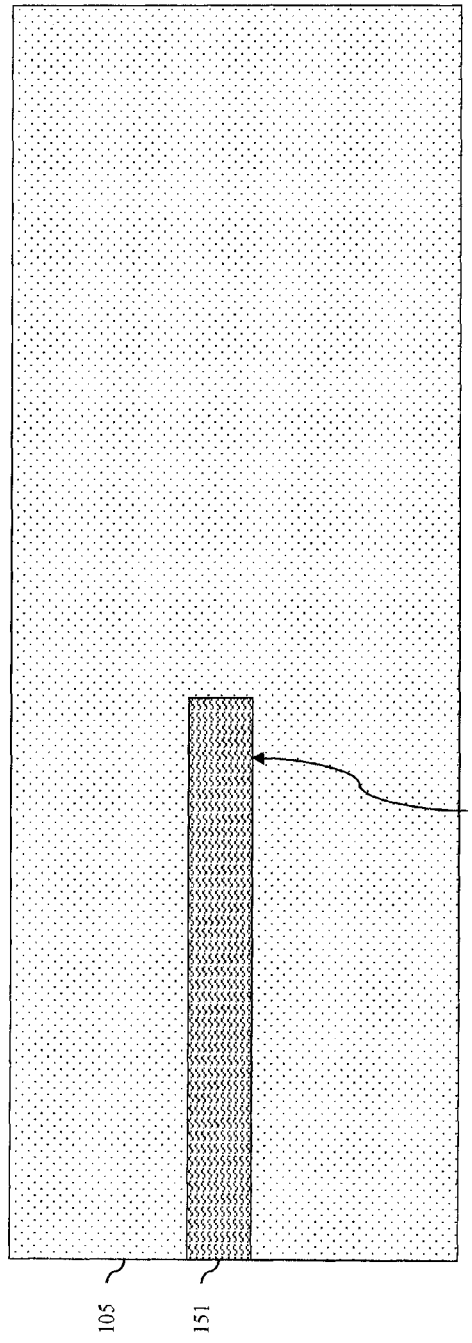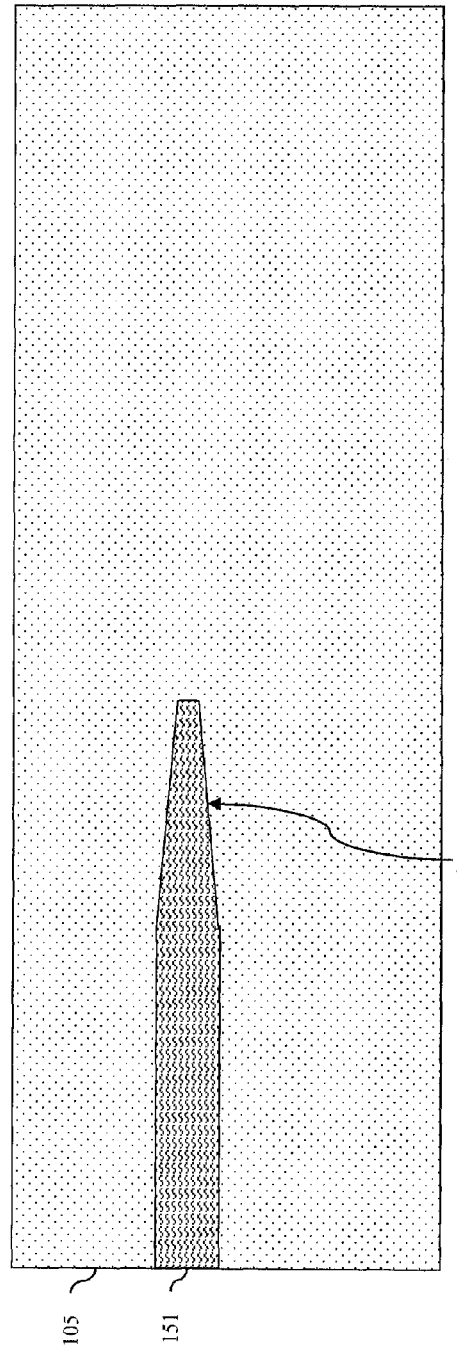

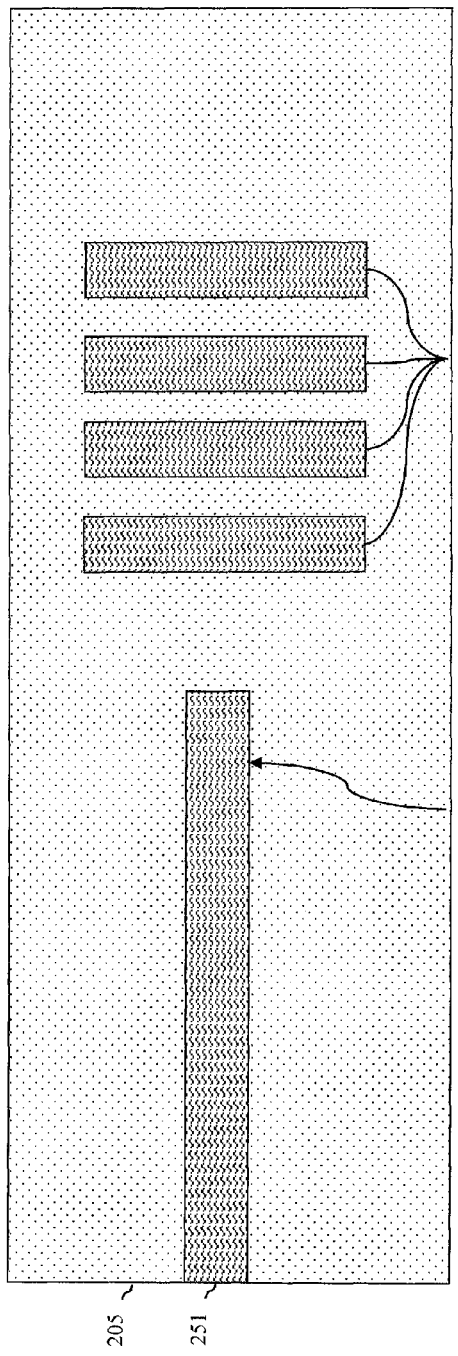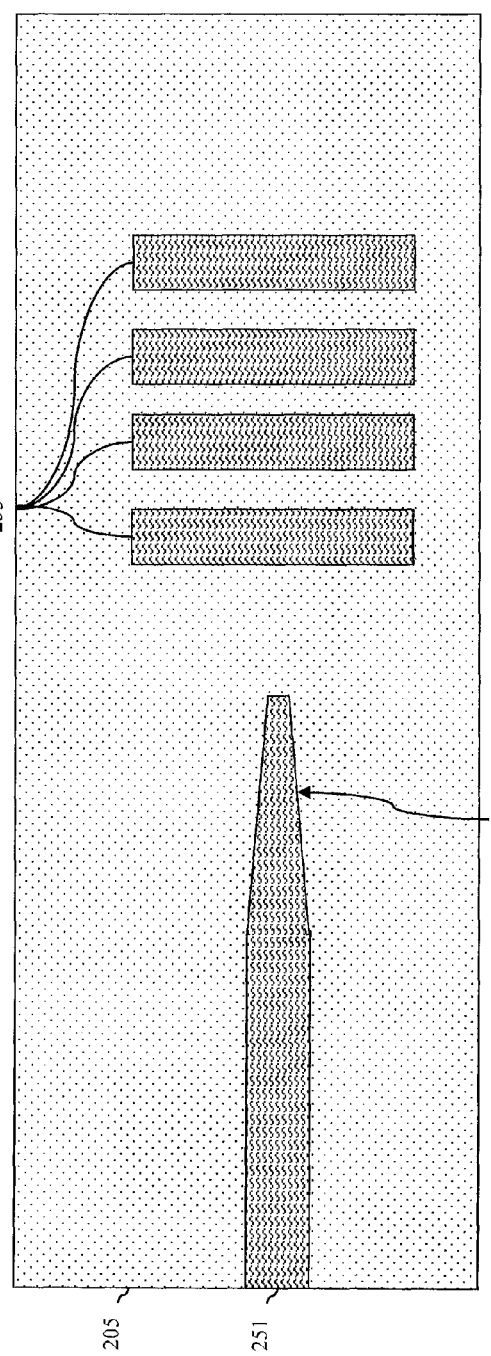
FIG. 6A
FIG. 6B

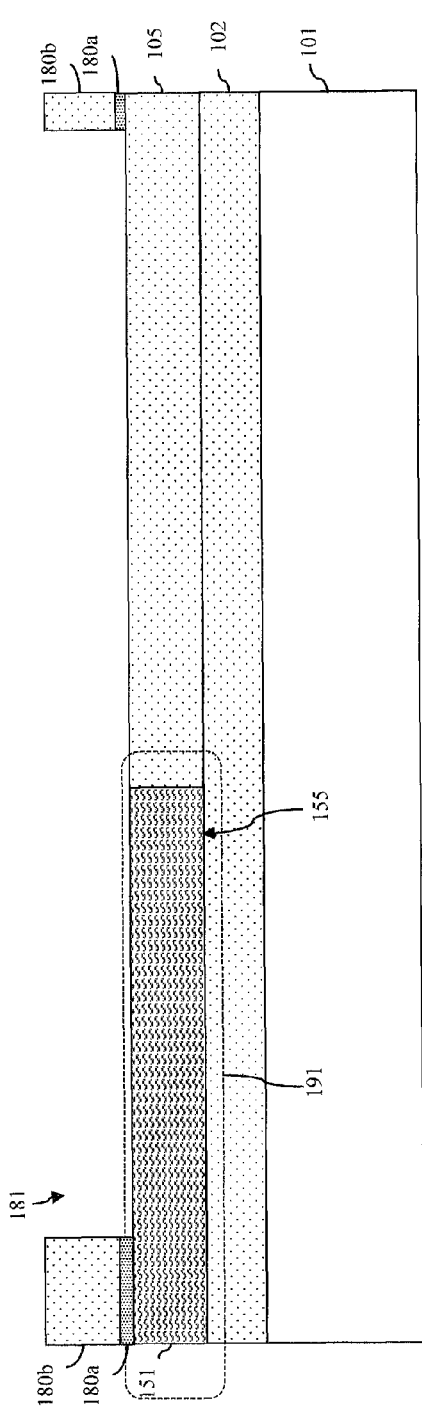
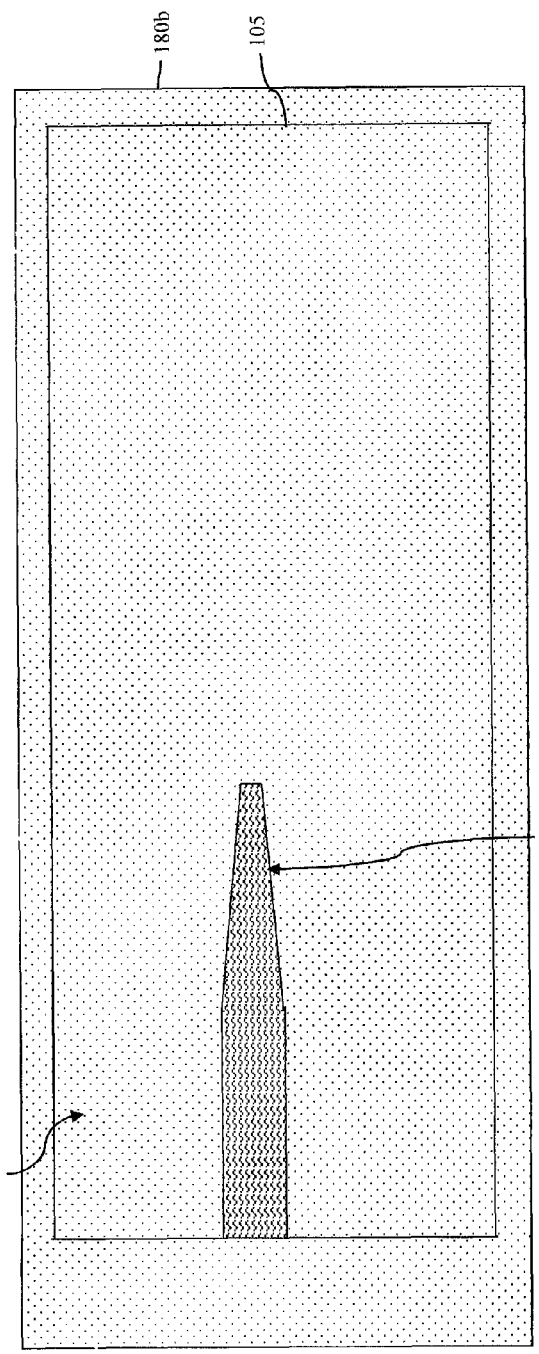
FIG. 10A
FIG. 10B

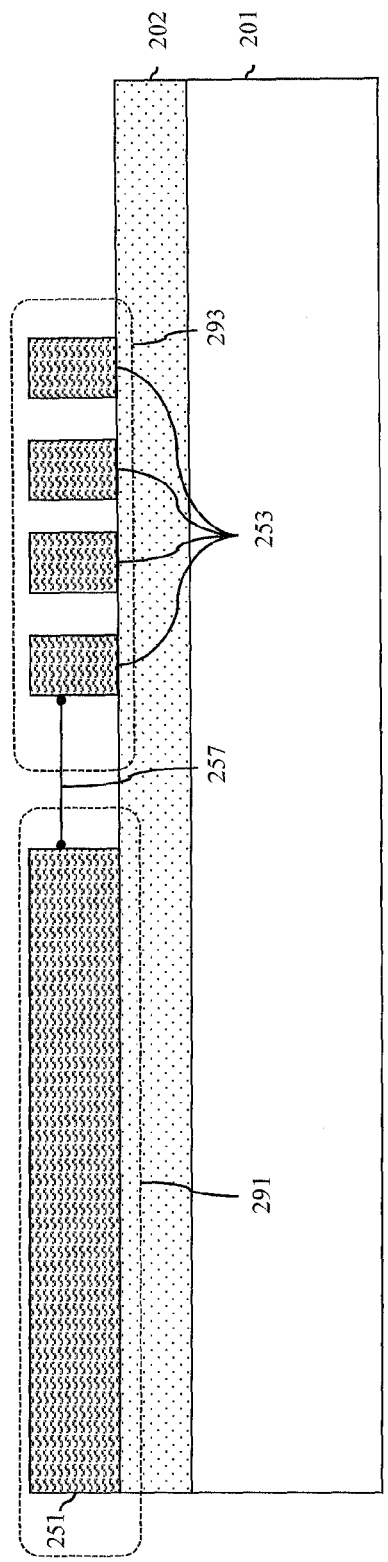
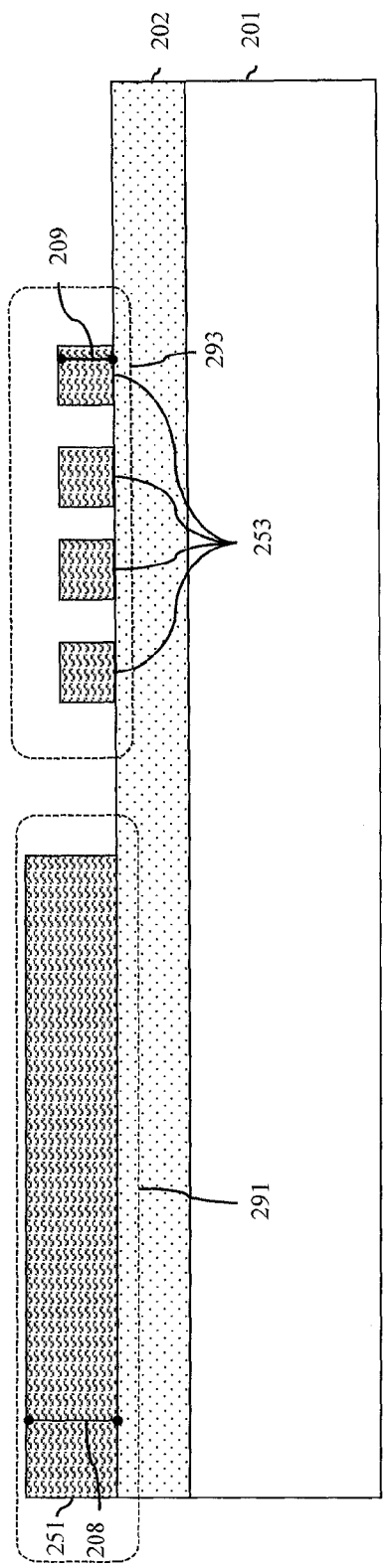

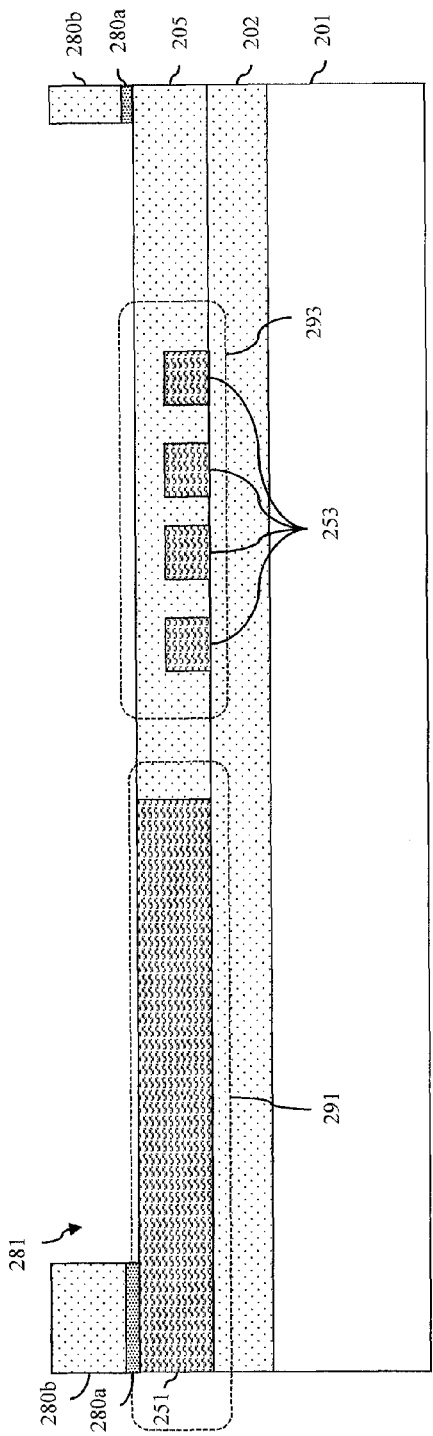
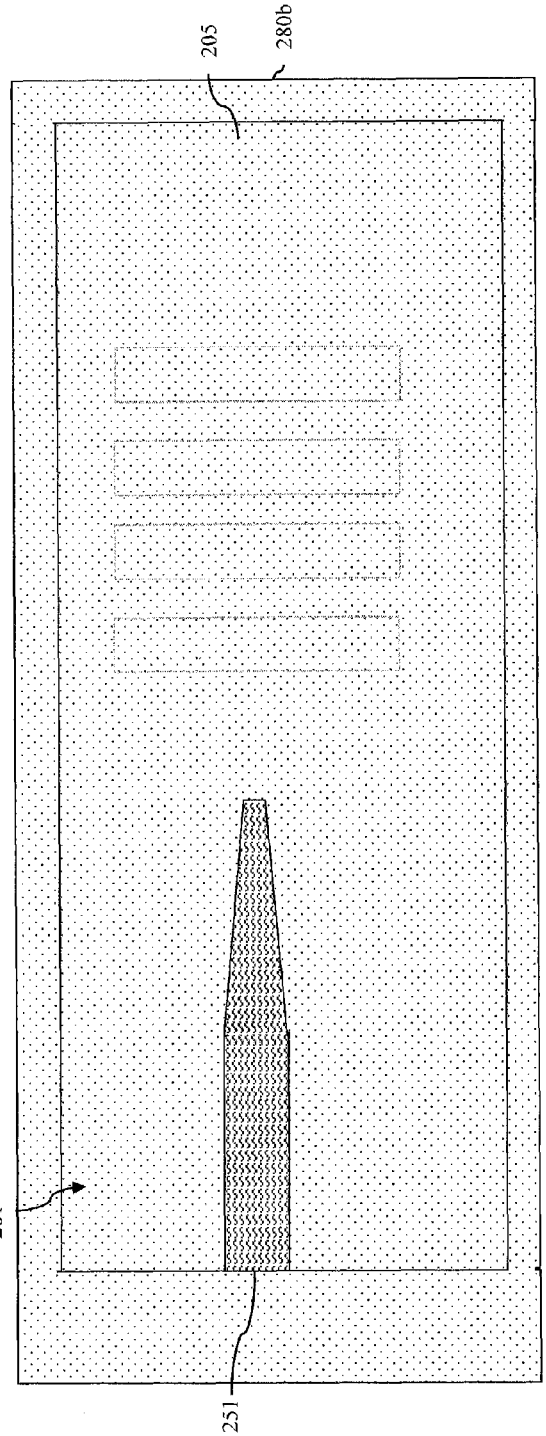

US 9,274,283 B1

SILICON PHOTONICS ALIGNMENT TOLERANT VERTICAL GRATING COUPLERS

BACKGROUND

The present disclosure relates to optoelectronic integrated circuits and, more specifically, to optoelectronic integrated circuit structures with grating couplers and methods of forming those structures. Generally, optoelectronic integrated circuit chips comprise a variety of optical devices. For example, optical waveguides transmit optical signals (also referred to herein as light signals or light beams) on an optoelectronic integrated circuit chip. Photodetectors (also referred to herein as photosensors or optical receivers, such as photodiodes) receive optical signals from optical waveguides and convert the optical signals into electronic signals for processing by electronic devices on the chip. Light-emitting diodes (LEDs) or laser diodes receive electronic signals from electronic devices, convert the electronic signals into light signals and transmit the light signals to optical waveguides. Grating couplers couple optical waveguides with off-chip optical devices, such as optical fibers, so that optical signals can be received on the chip from the off-chip optical device and/or transmitted off the chip to the off-chip optical device. Silicon is often used as the core material of an optical waveguide because silicon is transparent to optical signals in the infrared wavelength bands. Silicon is often also used for the adjacent grating coupler because silicon grating coupler formation can be easily integrated with current optoelectronic integrated circuit processing. Typically, a silicon grating coupler is formed adjacent to one end of a silicon optical waveguide and on the same horizontal plane as that silicon optical waveguide. However, the alignment tolerance achievable with such a configuration is relatively small and some applications (e.g., automated wafer scale testing, automated die or module scale testing, automated packaging, etc.) require a greater alignment tolerance.

SUMMARY

Disclosed is an optoelectronic integrated circuit structure comprising an insulator layer. This structure can further comprise a semiconductor core of a first optical waveguide on the insulator layer and an isolation region on the insulator layer laterally surrounding the semiconductor core. The isolation region can comprise a first dielectric material. This structure can further comprise a dielectric core of a second optical waveguide. This dielectric core can comprise at least one layer of a second dielectric material, which is different from the first dielectric material. The layer(s) of the second dielectric material can have a first section above an end of the semiconductor core and a second section above the isolation region. This dielectric core can further comprise a stack of dielectric layers above the first section and extending laterally onto the second section. This structure can further comprise a grating coupler comprising multiple dielectric fins above the second section and positioned laterally adjacent to the stack of dielectric layers. The dielectric fins can be perpendicularly oriented relative to both the stack of dielectric layers and the end of the semiconductor core. The stack of dielectric layers and each of the dielectric fins can comprise a layer of the first dielectric material and additional layers of the second dielectric material above the layer of the first dielectric material. In such a structure, the second optical waveguide can transmit optical signals between the grating coupler and the first optical waveguide.

Disclosed is another optoelectronic integrated circuit structure comprising an insulator layer. This structure can further comprise, on the insulator layer, a semiconductor core of a first optical waveguide and a grating coupler adjacent to an end of the semiconductor core. The grating coupler can comprise multiple semiconductor fins that are perpendicularly oriented relative to the end of the semiconductor core and that are shorter than the semiconductor core. This structure can further comprise an isolation region on the insulator layer laterally surrounding the semiconductor core and each of the fins and further covering the fins. This isolation region can comprise a first dielectric material. This structure can further comprise a dielectric core of a second optical waveguide. The dielectric core can comprise multiple dielectric layers above the end of the semiconductor core and extending laterally over the isolation region and the semiconductor fins within the isolation region. The multiple dielectric layers can comprise at least one layer of a second dielectric material different from the first dielectric material, a layer of the first dielectric material above the at least one layer of the second dielectric material, and additional layers of the second dielectric material above the layer of the first dielectric material. In such a structure, the second optical waveguide can transmit optical signals between the grating coupler and the first optical waveguide.

Also disclosed is a method of forming an optoelectronic integrated circuit structure. This method can comprise forming an opening in at least one protective layer so as to expose an end of a semiconductor core for a first optical waveguide and an isolation region, comprising a first dielectric material, adjacent to the end. Then, multiple dielectric layers can be deposited over the protective layer(s) and in the opening. The multiple dielectric layers can comprise at least one layer of a second dielectric material. The second dielectric material can be different from the first dielectric material and the layer(s) of the second dielectric material can have a first section above the end of the semiconductor core and a second section above the isolation region. The multiple dielectric layers can further comprise a layer of the first dielectric material on the at least one layer of the second dielectric material and additional layers of the second dielectric material on the layer of the first dielectric material. This method can further comprise forming a trench in the multiple dielectric layers within the opening such that the trench extends vertically to the layer(s) of the second dielectric material, such that the trench defines, for a dielectric core of a second optical waveguide, a stack of dielectric layers above the first section and extending laterally onto the second section and such that the trench further defines, for a grating coupler, multiple dielectric fins above the second section and positioned laterally adjacent to the stack of dielectric layers. The multiple dielectric fins can be essentially perpendicularly oriented relative to both the stack of dielectric layers and the end of the semiconductor core.

Disclosed is another method of forming an optoelectronic integrated circuit structure. This method can comprise forming an opening in at least one protective layer so as to expose an end of a semiconductor core for a first optical waveguide and an isolation region, comprising a first dielectric material, adjacent to the end. Then, multiple dielectric layers can be deposited over the protective layer(s) and in the opening. The multiple dielectric layers can comprise at least one layer of a second dielectric material for a dielectric core of a second optical waveguide. The second dielectric material can be different from the first dielectric material and the layer(s) of the second dielectric material can have a first section above the end of the semiconductor core and a second section above the isolation region. The multiple dielectric layers can further comprise a layer of the first dielectric material on the at least one layer of the second dielectric material and additional layers of the second dielectric material on the layer of the first dielectric material. This method can further comprise forming a trench in the multiple dielectric layers within the opening such that the trench extends vertically to the at least one layer of the second dielectric material, such that the trench defines, for a dielectric core of a second optical waveguide, a stack of dielectric layers above the first section and extending laterally onto the second section, and such that the trench further defines, for a grating coupler, multiple dielectric fins above the second section and position laterally adjacent to the stack of dielectric layers. The multiple dielectric fins can be essentially perpendicularly oriented relative to both the stack of dielectric layers and the end of the semiconductor core. In this case, at least one conformal layer of the second dielectric material can further be formed over the stack of dielectric layers and the dielectric fins. Then, a blanket layer of a third dielectric material can be formed on conformal layer(s) of the second dielectric material. The third dielectric material can be different than the first dielectric material and the second dielectric material.

Disclosed is yet another method of forming an optoelectronic integrated circuit structure. This method can comprise forming, from a semiconductor layer on an insulator layer, a semiconductor core of a first optical waveguide and multiple semiconductor fins of a grating coupler. The semiconductor fins can be perpendicularly oriented relative to an end of the semiconductor core and can further be shorter than the semiconductor core. Additionally, an isolation region can be formed that laterally surrounds the semiconductor core and the semiconductor fins and that further covers the semiconductor fins. The isolation region can comprise a first dielectric material. Then, at least one protective layer can be formed above the semiconductor core and the isolation region and an opening can be formed in protective layer (s) so as to expose an end of the semiconductor core and a portion of the isolation region adjacent to the end containing the semiconductor fins. This method can further comprise forming, in the opening, multiple dielectric layers for a dielectric core of a second optical waveguide. The multiple dielectric layers can be on the end of the semiconductor core and can extend laterally onto the adjacent portion of the isolation region. The multiple dielectric layers can comprise at least one layer of a second dielectric material, which is different from the first dielectric material, a layer of the first dielectric material on the layer(s) of the second dielectric material, and additional layers of the second dielectric material on the layer of the first dielectric material.

BRIEF DESCRIPTION OF THE DRAWINGS

The embodiments herein will be better understood from the following detailed description with reference to the drawings, which are not necessarily drawn to scale and in which:

FIG. 3A is a cross-section diagram illustrating a shape of a semiconductor core in the structures of FIG. 1 or 2;

FIG. 3B is a cross-section diagram illustrating an alternative shape of the semiconductor core in the structures of FIG. 1 or 2;

FIG. 6A is a cross-section diagram illustrating a shape of a semiconductor core and semiconductor fins in the structure of FIG. 5;

FIG. 6B is a cross-section diagram illustrating alternative shapes of the semiconductor core and semiconductor fins in the structure of FIG. 5;

FIGS. 10A and 10B are cross-section and top view diagrams, respectfully, illustrating a partially completed structure formed according to the method of FIG. 7;

FIG. 19 is a cross-section diagram illustrating a partially completed structure formed according to the method of FIG. 18;

FIG. 20 is a cross-section diagram illustrating a partially completed structure formed according to the method of FIG. 18;

FIGS. 23A and 23B are cross-section and top view diagrams, respectfully, illustrating a partially completed structure formed according to the method of FIG. 18;

DETAILED DESCRIPTION

As mentioned above, silicon grating coupler is formed adjacent to one end of a silicon optical waveguide and on the same horizontal plane as that silicon optical waveguide. However, the alignment tolerance achievable with such a configuration is relatively small and some applications (e.g., automated wafer scale testing, automated die or module scale testing, automated packaging, etc.) require a greater alignment tolerance. In view of the foregoing, disclosed herein are optoelectronic integrated circuit structures that incorporate a first optical waveguide, having a semiconductor core, indirectly coupled to a grating coupler through a second optical waveguide, having a dielectric core, in order provide a relatively large alignment tolerance. The dielectric core can comprise multiple dielectric layers above one end of the semiconductor core and extending laterally over an isolation region adjacent to that end. The grating coupler can include dielectric fins above the isolation region. Alternatively, the grating coupler can include semiconductor fins within the isolation region. Also disclosed herein are methods of forming such optoelectronic integrated circuit structures that can be readily integrated with complementary metal oxide semiconductor (CMOS) device processing and germanium photodetector processing.

Figure 1:
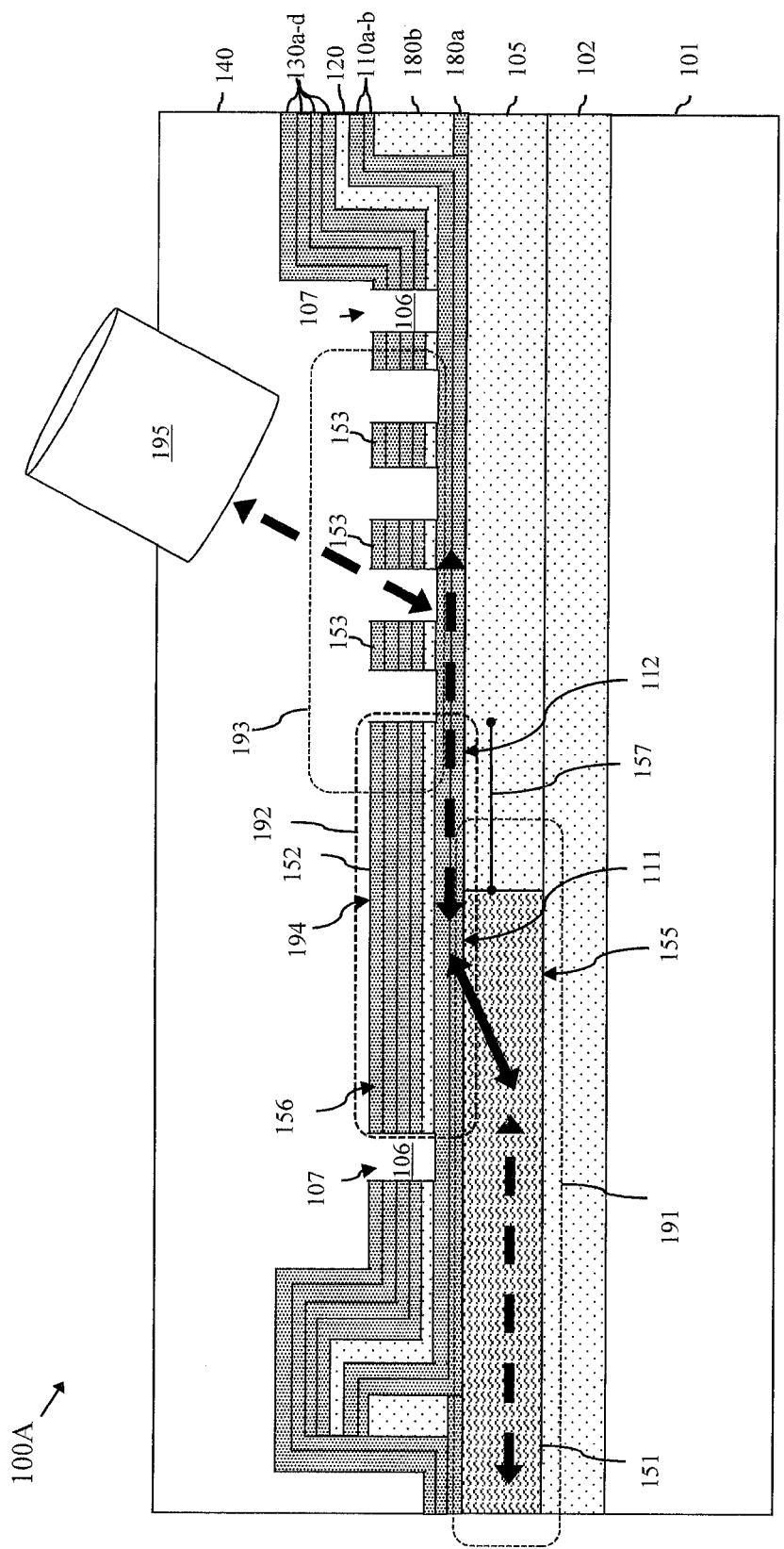
FIG. 1 is a cross-section diagram illustrating an optoelectronic integrated circuit structure.
Figure 2:
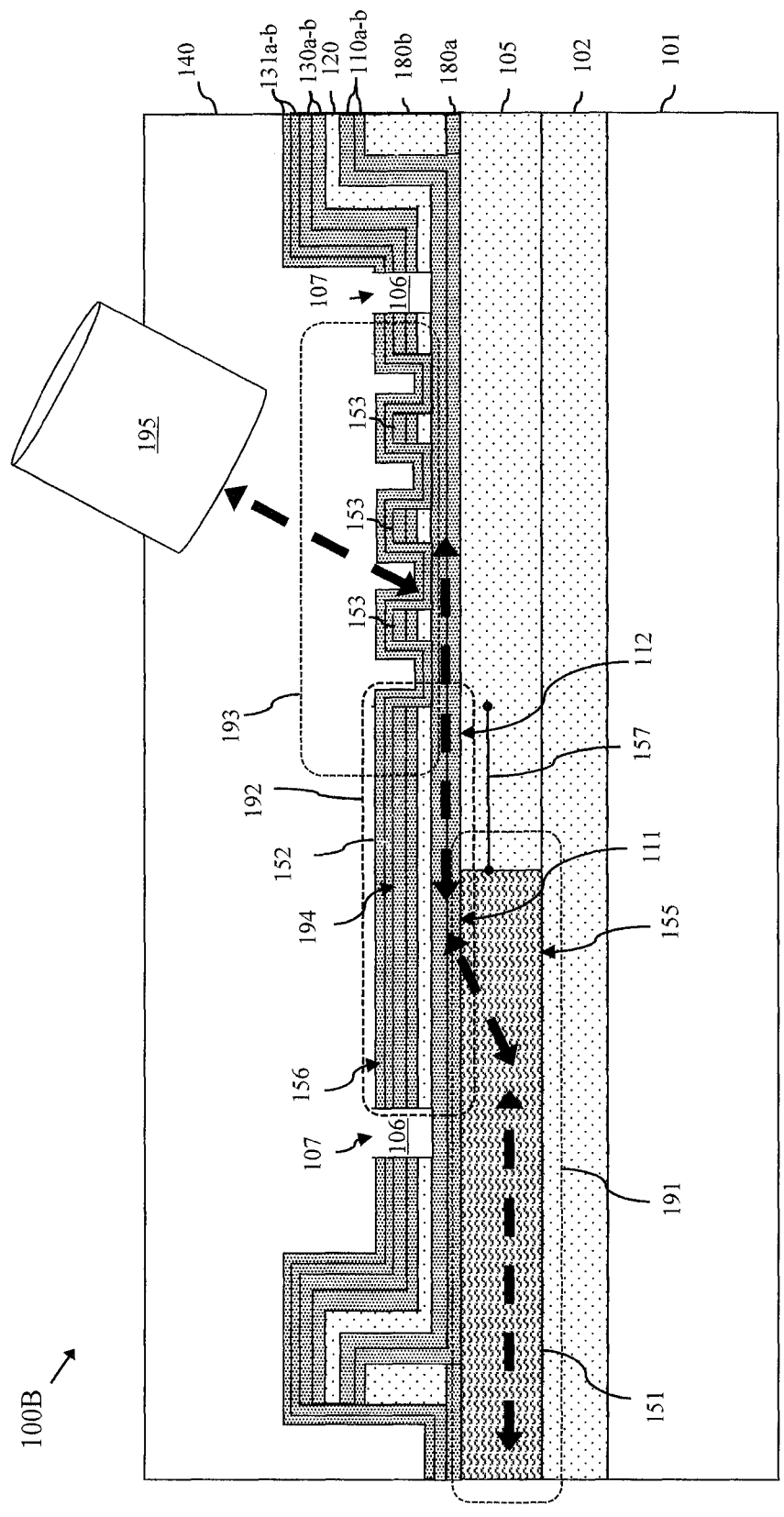
FIG. 2 is a cross-section diagram illustrating another optoelectronic integrated circuit structure.

More particularly, disclosed herein are optoelectronic integrated circuit structures 100A of FIGS. 1 and 100B of FIG. 2 that incorporate a first optical waveguide 191, having a semiconductor core 151, indirectly coupled to a grating coupler 193 through a second optical waveguide 192, having a dielectric core 152. In these optoelectronic integrated circuit structures 100A and 100B the grating coupler 193 can comprise multiple, essentially parallel, dielectric fins 153. For purposes of this disclosure a "dielectric fin" refers to a discrete, relatively thin, essentially rectangular, dielectric structure. Specifically, the optoelectronic integrated circuit structures 100A and 100B can each comprise a semiconductor substrate 101. This semiconductor substrate 101 can comprise a silicon substrate or other suitable semiconductor substrate. The optoelectronic integrated circuit structures 100A and 100B can each further comprise an insulator layer 102 on the semiconductor substrate 101 and a semiconductor layer on the insulator layer 102. The semiconductor layer can comprise a silicon layer or any other suitable semiconductor layer and the insulator layer 102 can comprise a first dielectric material. An isolation region 105 can extend vertically through the semiconductor layer to the insulator layer 102 in order to define a semiconductor core 151 (e.g., a silicon core) of a first optical waveguide 191 on the insulator layer 102. The isolation region 105 can comprise, for example, a shallow trench isolation (STI) region comprising a trench that laterally surrounds and, thereby defines the outer edges of the semiconductor core 151. This trench can be filled with the same first dielectric material as used for the insulator layer 102. It should be noted that the semiconductor core 151 can be defined by the isolation region 105 such that it is essentially rectangular in shape, as shown in FIG. 3A. Alternatively, the semiconductor core 151 can be defined by the isolation region 105 such that it has at least one end 155 that is tapered, as shown in FIG. 3B. In any case, the first dielectric material used for the insulator layer 102 and the isolation region 105 can specifically comprise a dielectric material that has a lower refractive index than the semiconductor material of the semiconductor core 151. Thus, for example, if the semiconductor material of the semiconductor core 151 comprises silicon, which has a refractive index of approximately 3.5, then the first dielectric material of the insulator layer 102 and the isolation region 105 can comprise silicon dioxide, which has a refractive index of approximately 1.45.

The optoelectronic integrated circuit structures 100A and 100B can each further comprise a dielectric core 152 of a second optical waveguide 192. The dielectric core 152 can comprise at least one layer 110a-b of a second dielectric material. The layer(s) 110a-b of the second dielectric material can have a first section 111 on and, particularly, above and immediately adjacent to the end 155 of the semiconductor core 151 and a second section 112 that extends laterally from the first section 111 onto and, particularly, above and immediately adjacent to, a portion of the isolation region 105 that is adjacent to and in end-to-end alignment with that end 155. For purposes of illustration, two layers 110a and 110b of the second dielectric material are shown; however, it should be understood that any number of one or more layers of the second dielectric material could be used. In any case, this second dielectric material can be different from the first dielectric material and, specifically, can have a higher refractive index than the first dielectric material while still having a lower refractive index than the semiconductor material of the semiconductor core 151. Thus, for example, in the optoelectronic integrated circuit structures 100A and 100B, if the semiconductor material of the semiconductor core 151 comprises silicon, which has a refractive index of approximately 3.5 and the first dielectric material of the insulator layer 102 and the isolation region 105 comprises silicon dioxide, which has a refractive index of approximately 1.45, the second dielectric material can comprise silicon nitride, which has a refractive index of approximately 2.0. The dielectric core 152 can further comprise a stack 194 of dielectric layers on the first section 111 and extending laterally onto the second section 112 of the layer(s) 110a-b of the second dielectric material. Thus, the end 155 of the semiconductor core 151 of the first optical waveguide 191 is overlaid by and in direct contact with an adjacent end 156 of the dielectric core 152 of the second optical waveguide 192.

The optoelectronic integrated circuit structures 100A and 100B can also comprise a grating coupler 193 comprising multiple dielectric fins 153 that are above the second section 112 of the layer(s) 110a-b of the second dielectric material, that are positioned laterally adjacent to the stack 194 of dielectric layers and that are separated from the semiconductor core 151 by some distance 157. The dielectric fins 153 can be essentially perpendicularly oriented relative to the stack 194 of dielectric layers and the end 155 of the semiconductor core 151.

In any case, the stack 194 of dielectric layers and each of the dielectric fins 153 can comprise a layer 120 of the first dielectric material and, above that layer 120, additional layers of the second dielectric material (e.g., see the four additional layers 130a-d of the second dielectric material in the optoelectronic integrated circuit structure 100A of FIG. 1 or the two additional layers 130a-b of the second dielectric material in the optoelectronic integrated circuit structure 100B of FIG. 2, as discussed in greater detail below). Although not shown, the layer 120 of the first dielectric material within each of the dielectric fins 153 and/or within the stack 194 may be relatively narrow as compared to additional layers of the second dielectric material above due to lateral etch back of the first dielectric material that may occur during processing.

As illustrated in the optoelectronic integrated circuit structure 100A of FIG. 1, there can be at least three additional layers (e.g., four additional layers 130a-d) of the second dielectric material in the stack 194 of dielectric layers and in each of the dielectric fins 153. In this case, the optoelectronic integrated circuit structure 100A can further comprise a blanket layer 140 of a third dielectric material over the stack 194 of dielectric layers and over the dielectric fins 153 of the grating coupler 193. Alternatively, as illustrated in the optoelectronic integrated circuit structure 100B of FIG. 1, there can be two additional layers 130a-b of the second dielectric material in the stack 194 of dielectric layers and in each of the dielectric fins 153. In this case, the optoelectronic integrated circuit structure 100B can further comprise at least one conformal layer (e.g., see conformal layers 131a-b) of the second dielectric material formed over the stack 194 of dielectric layers and over each the dielectric fins 153 and, on the conformal layer(s) 131a-b, a blanket layer 140 of a third dielectric material.

As mentioned above, the layer(s) 110a-b of the second dielectric material and the additional layers 130a-d of the second dielectric material in the optoelectronic integrated circuit structure 100A comprise the same second dielectric material (e.g., silicon nitride). Similarly, the layer(s) 110a-b of the second dielectric material, the additional layers 130a-b of the second dielectric material, and the conformal layer(s) 131a-b of the second dielectric material in the optoelectronic integrated circuit structure 100B comprise the same second dielectric material (e.g., silicon nitride). However, in either case, one or more of these layers of the second dielectric material can have different physical properties. For example, one or more of these layers can have different film stresses, different thicknesses, different indices of refraction that are greater than the index of refraction of the first dielectric material and less than that of the semiconductor material of the semiconductor core 151. Also, in either case, the third dielectric material of the blanket layer 140 can be different from the first and second dielectric materials. Specifically, this third dielectric material can have a refractive index that is less than the composite refractive index of all of the dielectric layers in the dielectric core 152 (i.e., of the layer(s) 110a-b and the layers 130a-d in the stack 194 of dielectric layers in the dielectric core 152 of the optoelectronic integrated circuit structure 100A or the layer(s) 110a-b, the layers 130a-b in the stack 194 of dielectric layers and the conformal layer(s) 131a-b in the dielectric core 152 of the optoelectronic integrated circuit structure 100B). Thus, for example, this third dielectric material can comprise a conventional interlayer dielectric material such as borophosphosilicate glass (BPSG), phosphosilicate glass (PSG), boron silicate glass (BSG), or undoped silicate glass (USG).

The optoelectronic integrated circuit structures 100A and 100B can also each comprise a signal propagation termination region 106, which defines the outer boundaries of the second optical waveguide 192. Specifically, in the optoelectronic integrated circuit structure 100A, this signal propagation termination region 106 comprises a trench 107 that cuts through the layers in the stack 194 of dielectric layers (i.e., cuts through the additional layers 130a-d of the second dielectric material and the layer 120 of the first dielectric material below) to the top surface of the layer(s) 110a-b of the first dielectric material. In the optoelectronic integrated circuit structure 100B, this signal propagation termination region 106 comprises a trench 107 that cuts through the conformal layer(s) 131a-b of the second dielectric material and the layers in the stack 194 of dielectric layers (i.e., through the additional layers 130a-b of the second dielectric material and the layer 120 of the first dielectric material) to the top surface of the layer(s) 110a-b of the first dielectric material. In either case, the trench 107 can be patterned so as to define the shape of the dielectric core 152 and can be filled with the third material of the blanket layer 140. Since, as discussed in greater detail below, the third dielectric material of the blanket layer 140 functions as cladding material for the second optical waveguide 192, the signal propagation termination region 106 will limit (e.g., terminate, prevent, etc.) light signal propagation beyond the dielectric core 152, thereby defining the outer boundaries of the second optical waveguide 192.

Figure 4:
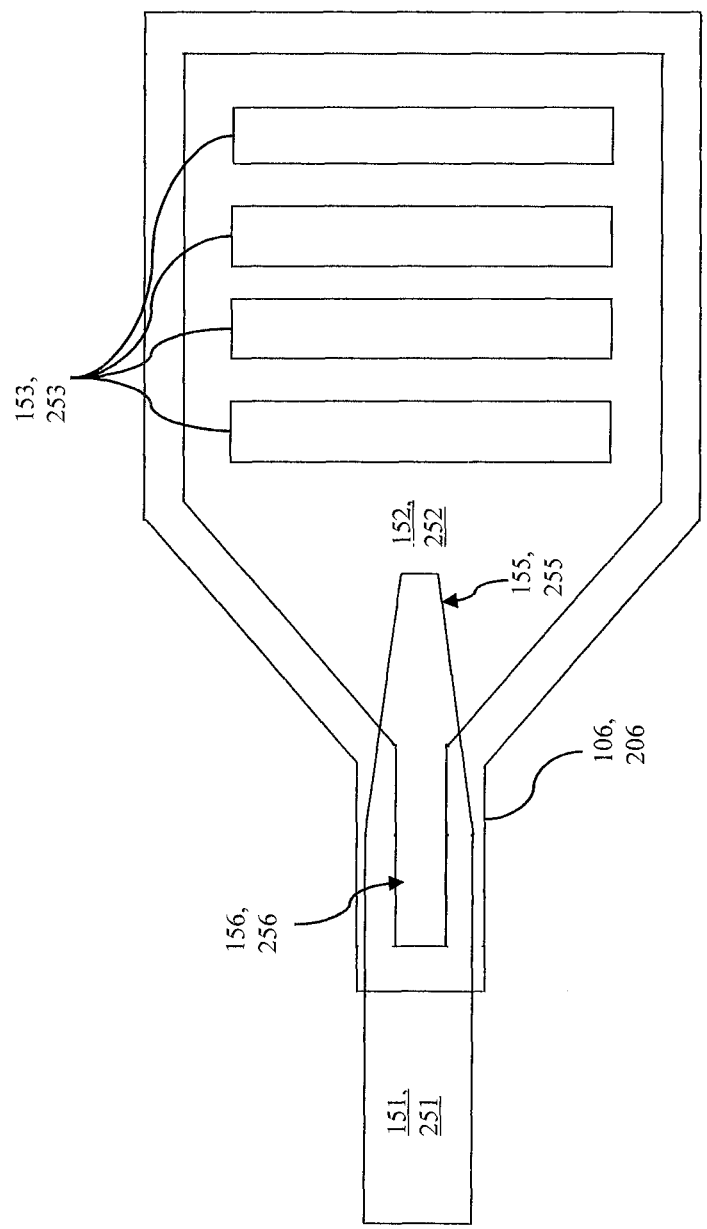
FIG. 4 is an overlay diagram illustrating possible shapes and relative positions of features of the optoelectronic integrated circuit structures disclosed herein.

FIG. 4 is an overlay drawing illustrating only possible shapes for and relative positions of the signal propagation termination region 106, the dielectric core 152 of the second optical waveguide 192, as defined by the signal propagation termination region 106, the semiconductor core 151 of the first optical waveguide 191 and the dielectric fins 153 of the grating coupler 193. It should be understood that this is not a cross-section diagram and that, in the case of the optoelectronic integrated circuit structure 100, the dielectric core 152 and dielectric fins 153 are above the level of the semiconductor core 151. As illustrated, the shape of the dielectric core 152 defined by the region 106 can taper between the dielectric fins 153 of the grating coupler 193 toward the end 155 of the semiconductor core 151. That is, the end 156 of the dielectric core 152 adjacent to (i.e., above and in direct contact with) the end 155 of the semiconductor core 151 can be relatively narrow and the dielectric core 152 can further expand in size from the end 155 of the semiconductor core 151 toward the dielectric fins 153 of the grating coupler 193.

Figure 5:
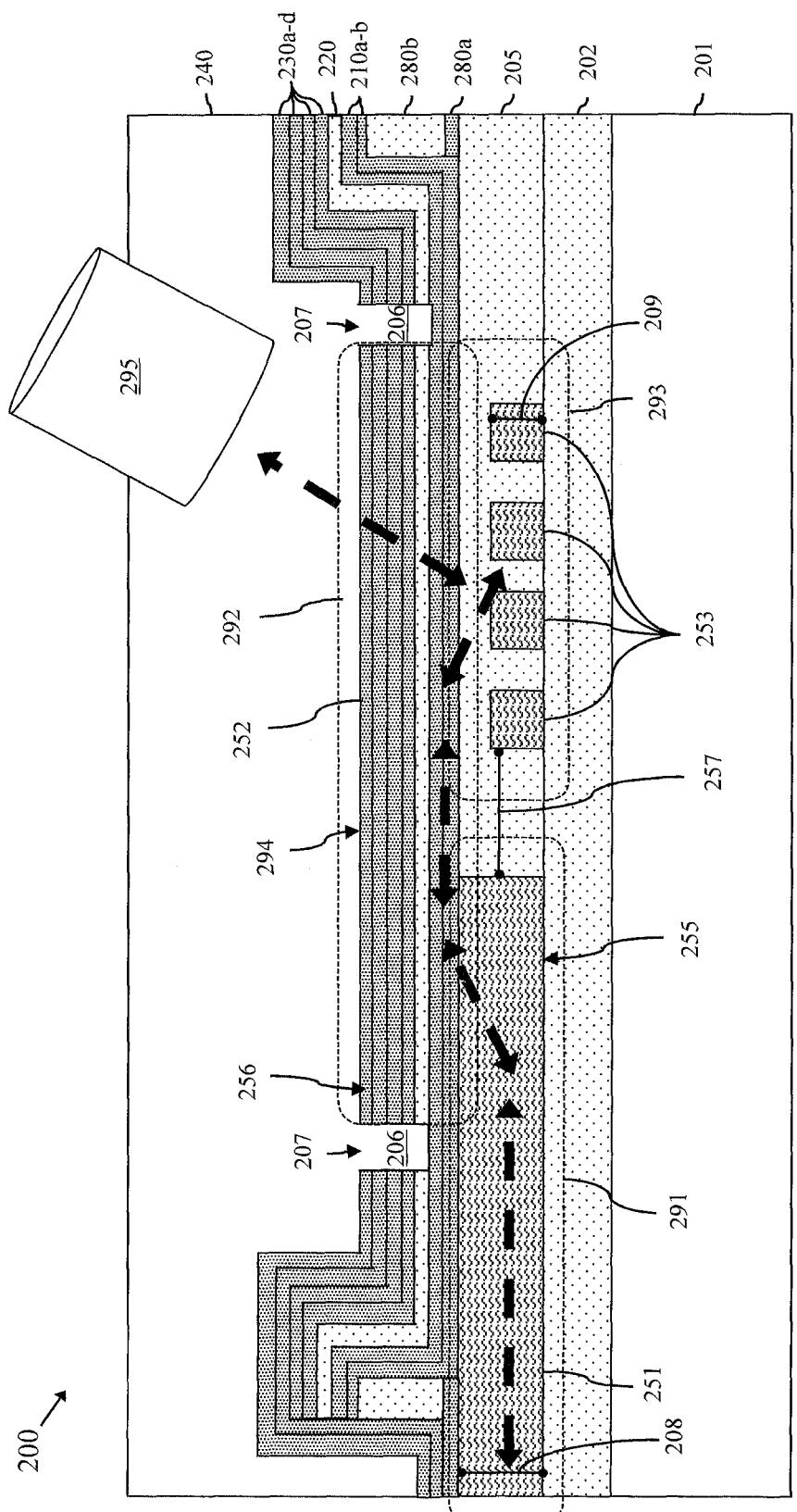
FIG. 5 is a cross-section diagram illustrating yet another optoelectronic integrated circuit structure.

Referring to FIG. 5, also disclosed herein is another optoelectronic integrated circuit structure 200 that incorporates a first optical waveguide 291, having a semiconductor core 251, indirectly coupled to a grating coupler 293 through a second optical waveguide 292, having a dielectric core 252. However, unlike in the optoelectronic integrated circuit structures 100A and 100B described above, in this optoelectronic integrated circuit structure 200 the grating coupler 293 can comprise multiple semiconductor fins 253. For purposes of this disclosure a "semiconductor fin" refers to a discrete, relatively thin, essentially rectangular, semiconductor structure. Specifically, the optoelectronic integrated circuit structure 200 can comprise a semiconductor substrate 201. This semiconductor substrate 201 can comprise a silicon substrate or other suitable semiconductor substrate. The optoelectronic integrated circuit structure 200 can further comprise an insulator layer 202 on the semiconductor substrate 201 and a semiconductor layer on the insulator layer 202. The semiconductor layer can comprise a silicon layer or other suitable semiconductor layer and the insulator layer 202 can comprise a first dielectric material. A semiconductor core 251 (e.g., a silicon core) of a first optical waveguide 291 and multiple semiconductor fins 253 of a grating coupler 293 can be defined within the semiconductor layer. The semiconductor core 251 and the semiconductor fins 253 can specifically be defined so that the semiconductor fins 253 are adjacent to an end 255 of the semiconductor core 251, are physically separated from that end 255 by some distance 257 and are essentially perpendicularly oriented relative to the end 255 of the semiconductor core 251. Additionally, the semiconductor fins 253 can be etched back during processing such that they are shorter than the semiconductor core 251 (i.e., such that the semiconductor core 251 has a first height 208 above the top surface of the insulator layer 202 and the semiconductor fins 253 have a second height 209, which is less than the first height 208, above the top surface of the insulator layer 202).

An isolation region 205 can laterally surround the semiconductor core 251 and each of the semiconductor fins 253 and can further cover the tops of the semiconductor fins 253. The isolation region 205 can comprise the same first dielectric material as the insulator layer 202. Optionally, the semiconductor core 251 and the semiconductor fins 253 can be covered by a conformal layer of a second dielectric material (e.g., silicon nitride) that physically separates the semiconductor core 251 and the semiconductor fins 253 from the isolation region 205 (not shown) in order to reduce device current leakages by inhibiting the diffusion of dopants and/or passivating surface states on the sidewalls of the semiconductor core 251 and semiconductor fins 253. It should be noted that the semiconductor core 251, as defined by the isolation region 205, can have an essentially rectangular shape, as shown in FIG. 6A. Alternatively, the semiconductor core 251 can have at least one end 255 that is tapered, as shown in FIG. 6B. In any case, the first dielectric material used for the insulator layer 202 and isolation region 205 can specifically comprise a dielectric material that has a lower refractive index than the semiconductor material of the semiconductor core 251. Thus, for example, if the semiconductor material of the semiconductor core 251 comprises silicon, which has a refractive index of approximately 3.5, then the first dielectric material of the insulator layer 202 and isolation region 205 can comprise silicon dioxide, which has a refractive index of approximately 1.45.

The optoelectronic integrated circuit structure 200 can further comprise a dielectric core 252 of a second optical waveguide 292. The dielectric core 252 can comprise multiple dielectric layers 294 above one end 255 of the semiconductor core 251 and extending laterally onto the isolation region 205 adjacent to that end 255 so as to be above the semiconductor fins 253 of the grating coupler 293. The multiple dielectric layers 294 can comprise at least one layer 210a-b of the second dielectric material. For purposes of illustration, two layers 210a and 210b of the second dielectric material are shown; however, it should be understood that any number of one or more layers of the second dielectric material could be used. The second dielectric material can be different from the first dielectric material. Specifically, this second dielectric material can have a higher refractive index than the first dielectric material while still having a lower refractive index than the semiconductor material of the semiconductor core. Thus, for example, if the semiconductor material of the semiconductor core 251 and semiconductor fins 253 comprises silicon, which has a refractive index of approximately 3.5 and the first dielectric material of the insulator layer 202 and the isolation region 205 and of the dielectric caps 254 comprises silicon dioxide, which has a refractive index of approximately 1.45, the second dielectric material can comprise silicon nitride, which has a refractive index of approximately 2.0. The dielectric layers 294 of the dielectric core 252 can further comprise a layer 220 of the first dielectric material above and immediately adjacent to the top surface of the layer(s) 210a-b of the second dielectric material and, on the layer 220 of the first dielectric material, additional layers (e.g., four additional layers 230a-d) of the second dielectric material. Thus, the end 255 of the semiconductor core 251 of the first optical waveguide 291 is overlaid by and in direct contact with an adjacent end 256 of the dielectric core 252 of the second optical waveguide 292.

As mentioned above, the layer(s) 210a-b of the second dielectric material and the additional layers 230a-d of the second dielectric material in the optoelectronic integrated circuit structure 200 comprise the same second dielectric material (e.g., silicon nitride). However, one or more of these layers of the second dielectric material can have different physical properties. For example, one or more of these layers can have different film stresses, different thicknesses, different indices of refraction that are greater than the index of refraction of the first dielectric material and less than that of the semiconductor material of the semiconductor core 251.

The optoelectronic integrated circuit structure 200 can further comprise a blanket layer 240 of a third dielectric material above the multiple dielectric layers 294. The third dielectric material can be different from the first dielectric material and the second dielectric material. Specifically, this third dielectric material can have a refractive index that is less than the composite refractive index of the multiple dielectric layers 294 of the dielectric core 252. For example, the third dielectric material can comprise a conventional interlayer dielectric material such as borophosphosilicate glass (BPSG), phosphosilicate glass (PSG), boron silicate glass (BSG), or undoped silicate glass (USG). The optoelectronic integrated circuit structure 200 can further comprise a signal propagation termination region 206, which defines the outer boundaries of the second optical waveguide 292. Specifically, in the optoelectronic integrated circuit structure 200, this signal propagation termination region 206 comprises a trench 207 that cuts through the additional layers 230a-d of the second dielectric material and the layer 220 of the first dielectric material to the top surface of the layer(s) 210a-b in the multiple dielectric layers 294. This trench 207 can be patterned so as to define the shape of the dielectric core 252 and can be filled with the third material of the blanket layer 240. Since, as discussed in greater detail below, the third dielectric material of the blanket layer 240 functions as cladding material for the second optical waveguide 292, the signal propagation termination region 206 will limit (e.g., terminate, prevent, etc.) light signal propagation beyond the dielectric core 252, thereby defining the outer boundaries of the second optical waveguide 292.

FIG. 4 is an overlay drawing illustrating only possible shapes for and relative positions of the signal propagation termination region 206, the dielectric core 252 of the second optical waveguide 292 as defined by the signal propagation termination region 206, the semiconductor core 251 of the first optical waveguide and the semiconductor fins 253 of the grating coupler 293. It should be understood that this is not a cross-section diagram and that, in the case of the optoelectronic integrated circuit structure 200, the semiconductor core 251 and semiconductor fins 253 are below the level of the dielectric core 252. As illustrated, the shape of the dielectric core 252 defined by the region 206 tapers between the semiconductor fins 253 of the grating coupler 293 to and along the end 255 of the semiconductor core 251. That is, an end 256 of the dielectric core 252 adjacent to (i.e., above and in direct contact with) the end 255 of the semiconductor core 251 can be relatively narrow and the dielectric core 252 can further expand in size from the end 255 of the semiconductor core 251 toward the semiconductor fins 253 of the grating coupler 293.

In the above described optoelectronic integrated circuit structures 100A of FIG. 1, 100B of FIG. 2 and 200 of FIG. 5, optical signals (i.e., light signals) from an off-chip optical device 195, 295 (e.g., an optical fiber) above can be projected toward the grating coupler 193, 293 from above and diffracted by dielectric fins 153, 253, thereby guiding the light signals into the second optical waveguide 192, 292 and from the second optical waveguide 192, 292 into the first optical waveguide 191, 291 (see the arrows indicating the signal path through the structures 100A, 100B and 200). Specifically, within the second optical waveguide 192, 292, cladding material, which includes the first dielectric material in the isolation region 105, 205 below the dielectric core 152, 252 and the third dielectric material of the blanket layer 140, 240 above the dielectric core 152, 252 and filling the signal propagation termination region 106, 206 laterally surrounding the dielectric core 152, 252, allows the optical signals to propagate along the dielectric core 152, 252. The second optical waveguide 192, 292 is coupled to the first optical waveguide 191, 291 at the interface between the end 155, 255 of the semiconductor core 151, 251 and the adjacent end 156, 256 of the dielectric core 152, 252 above. As mentioned above, the signal propagation termination region 106, 206 terminates signal propagation along the dielectric core 152, 252 beyond the region 106, 206. However, since the composite refractive index of the dielectric layers of the dielectric core 152, 252 is lower than the refractive index of the semiconductor material of the semiconductor core 151, 251, optical signals will pass from the dielectric core 152, 252 of the second optical waveguide 192, 292 into the semiconductor core 151, 251 of the first optical waveguide 191, 291. Within the first optical waveguide 191, 291, cladding material, which includes the first dielectric material of the insulator layer 102, 202 below the semiconductor core 151, 251 and of the isolation region 105, 205 laterally surrounding the semiconductor core 151, 251, allows the optical signals to propagate along the semiconductor core 151, 251.

Using a second optical waveguide 192, 292 with a dielectric core 152, 252 to indirectly couple a grating coupler 193, 293 to a first optical waveguide 191, 291 with a semiconductor core 151, 251 allows for improved alignment tolerance as compared to optoelectronic integrated circuit structures that directly couple grating couplers to optical waveguides with semiconductor cores. Specifically, because the difference between the refractive indices of the dielectric core 152, 252 of the second optical waveguide 192, 292 and its cladding material and, particularly, the third dielectric material above the dielectric core 152, 252 and within the signal propagation termination region 106, 206) is less than the difference between the refractive indices of the semiconductor core 151, 251 of the first optical waveguide 191, 291 and its cladding material, the diameter of the light beam projected onto the grating coupler 193, 293 from an off-chip optical device 195, 295 or from the grating coupler 193, 293 to an off-chip optical device 195, 295 can be expanded (e.g., from 8 μm to 32 μm).

More specifically, in operation of the above-described optoelectronic integrated circuit structures 100A-B of FIGS. 1-2 and 200 of FIG. 5, light can travel along the semiconductor core 151, 251 of the first optical waveguide 191, 291 towards the dielectric core 152, 252 of the second optical waveguide 192, 292 and further toward the grating coupler 193, 293. The light in the semiconductor core 151, 251 will typically have a modal size of less than 1 micron laterally and preferably less than 1 micron vertically (e.g., the light in the semiconductor core 151, 251 may have modal size of less than 600 nm laterally and less than 250 nm vertically). At the interface between the end 155, 255 of the semiconductor core 151, 251 of the first optical waveguide 191, 291 and the adjacent end 156, 256 of the dielectric core 152, 252 of the second optical waveguide 192, 292, the light will begin to evanescently couple to the dielectric core 152, 252 because of the relatively low composite refractive index of all of the dielectric layers of the dielectric core 152, 252, as compared to the relatively high refractive index of the semiconductor core 151, 251. The light will further expand as it travels along the dielectric core 152, 252 towards the grating coupler 193, 293, thereby achieving a lateral size designed to match that of the fiber mode (e.g., 10+/−1 micrometer or 50-200 microns, such as 62.5 micron). As the light propagates along the fins 153, 253 of the grating coupler 193, 293 it is scattered out vertically, simultaneously upward to the optical fiber 195, 295 as well as downward. Those skilled in the art will recognize that, after each fin of the grating coupler 193, 293 less and less light will be present, assuming a constant scattering coefficient, such that an approximately exponentially decaying field profile is formed. This exponentially field profile is radiating either vertically or at an angle that is off the wafer normal towards the optical fiber 195, 295. At the optical fiber 195, 295, the field portion overlapping with the Gaussian mode of the optical fiber 195, 295 is guided. Alternatively, the field is propagating through free space as a collimated beam. Alternatively, as mentioned above, the fins 153, 253 of the grating coupler 193, 293 may be non-uniform (e.g., may have different lengths and/or widths) so as to obtain an apodized grating that forms a Gaussian field profile instead of an exponentially decaying field profile in order to improve coupling efficiency.

It should be noted that the Figures and descriptions of the optoelectronic integrated circuit structures 100A-B and 200 are not intended to be limiting. For example, for illustration purposes, only four essentially parallel fins 153, 253 are shown in the grating coupler 193, 293. However, it should be understood that the number of essentially parallel fins 153, 253 in the grating coupler 193, 293 should be a sufficient number (e.g., 5, 10, 20, etc.) to ensure that those fins 153, 253 can diffract optical signals (i.e., light signals) between an off-chip optical device 195, 295 (e.g., an optical fiber) above and the dielectric core 152, 252 of the second optical waveguide 192, 292, as discussed above. Furthermore, these fins 153, 253 can have the same length and same width, as shown. However, alternatively, these fins 153, 253 can have different lengths and/or different widths. Also, for example, these optoelectronic integrated circuit structure 100A-B and 200 may include other features, which were not described or shown in the Figures, including, but not limited to, one or more additional reflectors (i.e., mirrors) below the grating coupler 193, 293. Such additional reflectors can comprise, for example, metal reflectors comprise any of aluminum, tungsten, copper, gold, silver, any other suitable reflective metal or alloys thereof.

Figure 7:
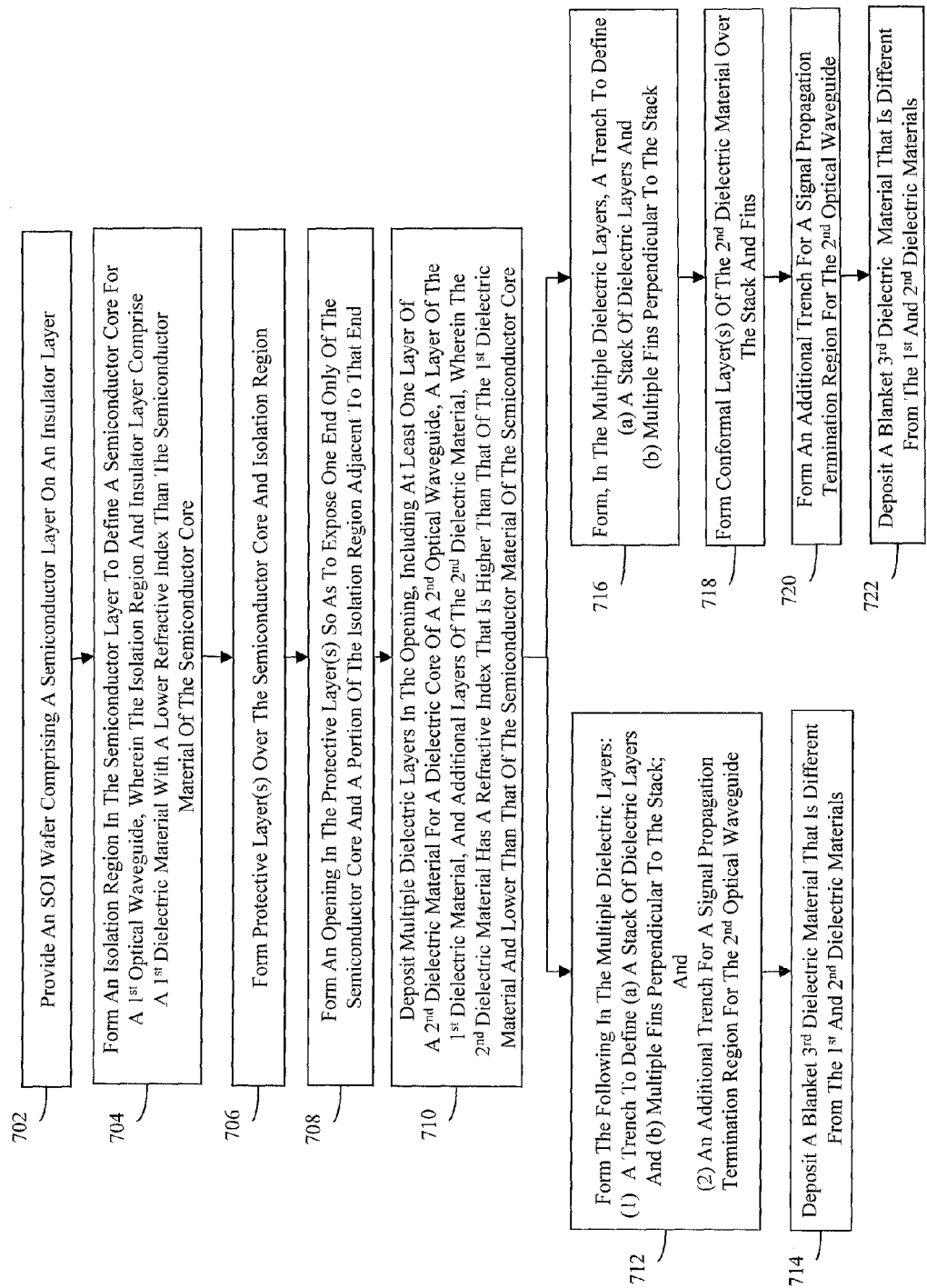
FIG. 7 is a flow diagram illustrating a method of forming the structures of FIGS. 1 and 2.
Figure 8:
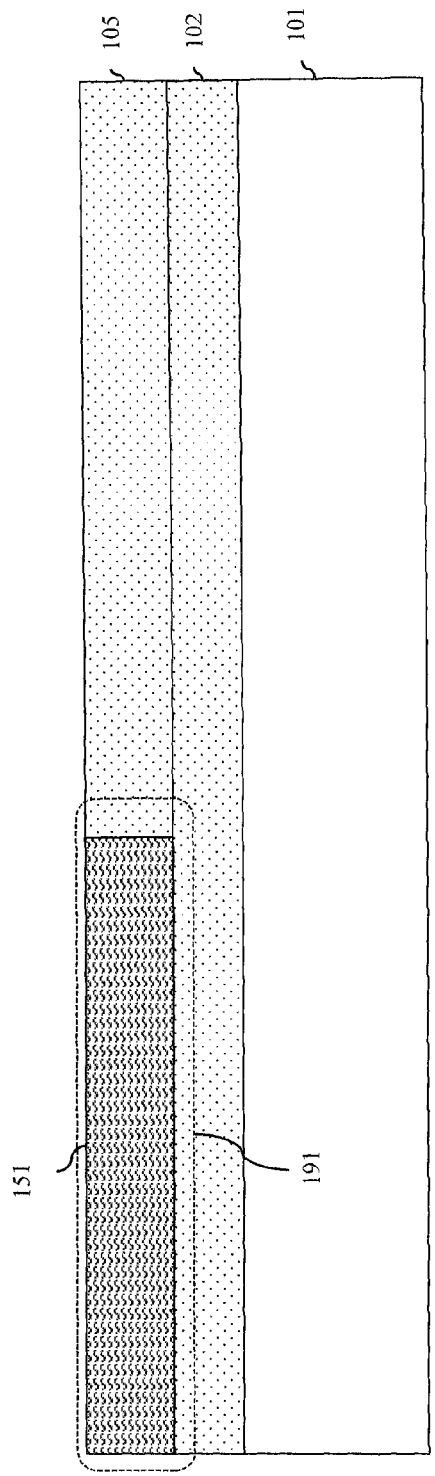
FIG. 8 is a cross-section diagram illustrating a partially completed structure formed according to the method of FIG. 7.

Referring to the flow diagram of FIG. 7, disclosed herein are methods of forming the optoelectronic integrated circuit structures 100A and 100B of FIGS. 1 and 2, respectively, which incorporate a first optical waveguide 191, having a semiconductor core 151, indirectly coupled to a grating coupler 193 through a second optical waveguide 192, having a dielectric core 152, wherein the grating coupler 193 comprises multiple dielectric fins 153. These methods can comprise providing a semiconductor-on-insulator (SOI) wafer (702). This SOI wafer can comprise a semiconductor substrate 101 (e.g., a silicon substrate), an insulator layer 102 on the semiconductor substrate 101 and a semiconductor layer (e.g., a silicon layer) on the insulator layer 102. The insulator layer 102 can comprise a first dielectric material. An isolation region 105 can be formed in the semiconductor layer above the insulator layer 102 so as to define a semiconductor core 151 (e.g., a silicon core) for a first optical waveguide 191 (704, see FIG. 8). For example, the isolation region 105 can be formed using conventional shallow trench isolation (STI) region formation techniques, wherein a trench is formed (e.g., lithographically patterned and etched) such that it laterally surrounds a portion of the semiconductor layer and, thereby defines the outer edges of the semiconductor core 151. This trench can then be filled with the same first dielectric material as used for the insulator layer 102 and a chemical mechanical polishing (CMP) process can be performed so as to expose the top surface of the semiconductor core 151. It should be noted that the semiconductor core 151 can be defined by the isolation region 105 at process 704 such that it is essentially rectangular in shape, as shown in FIG. 3A. Alternatively, the semiconductor core 151 can be defined by the isolation region 105 at process 704 so that it has at least one end 155 that is tapered, as shown in FIG. 3B. In any case, the first dielectric material used for the insulator layer 102 and isolation region 105 can specifically comprise a dielectric material that has a lower refractive index than the semiconductor material of the semiconductor core 151. Thus, for example, if the semiconductor material of the semiconductor core 151 comprises silicon, which has a refractive index of approximately 3.5, then the first dielectric material of the insulator layer 102 and isolation region 105 can comprise silicon dioxide, which has a refractive index of approximately 1.45.

Figure 9:
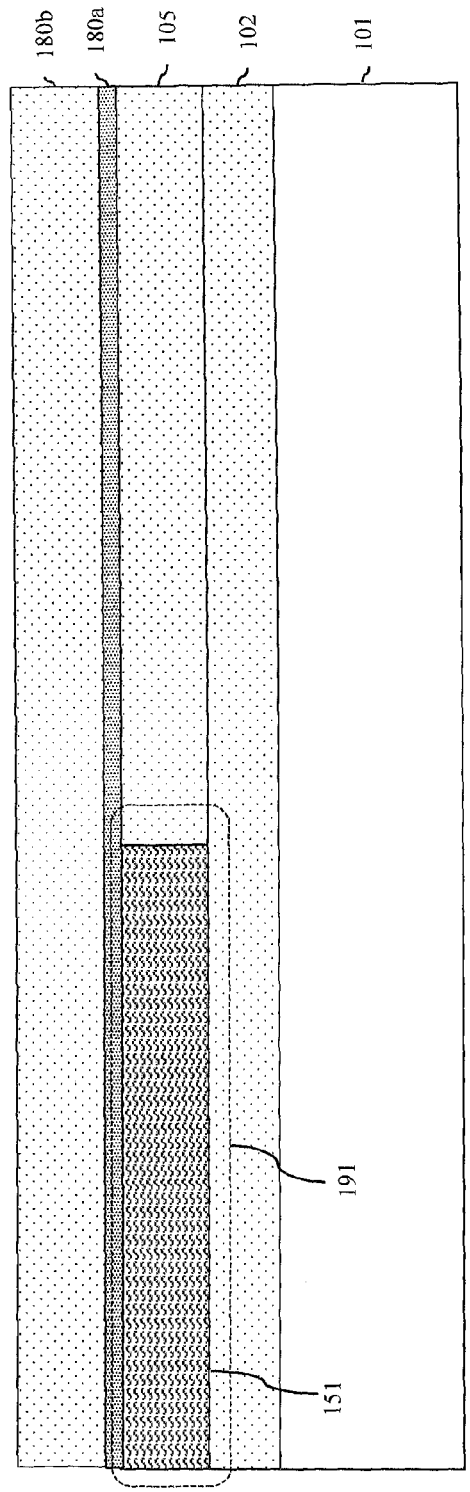
FIG. 9 is a cross-section diagram illustrating a partially completed structure formed according to the method of FIG. 7.
Figure 11:
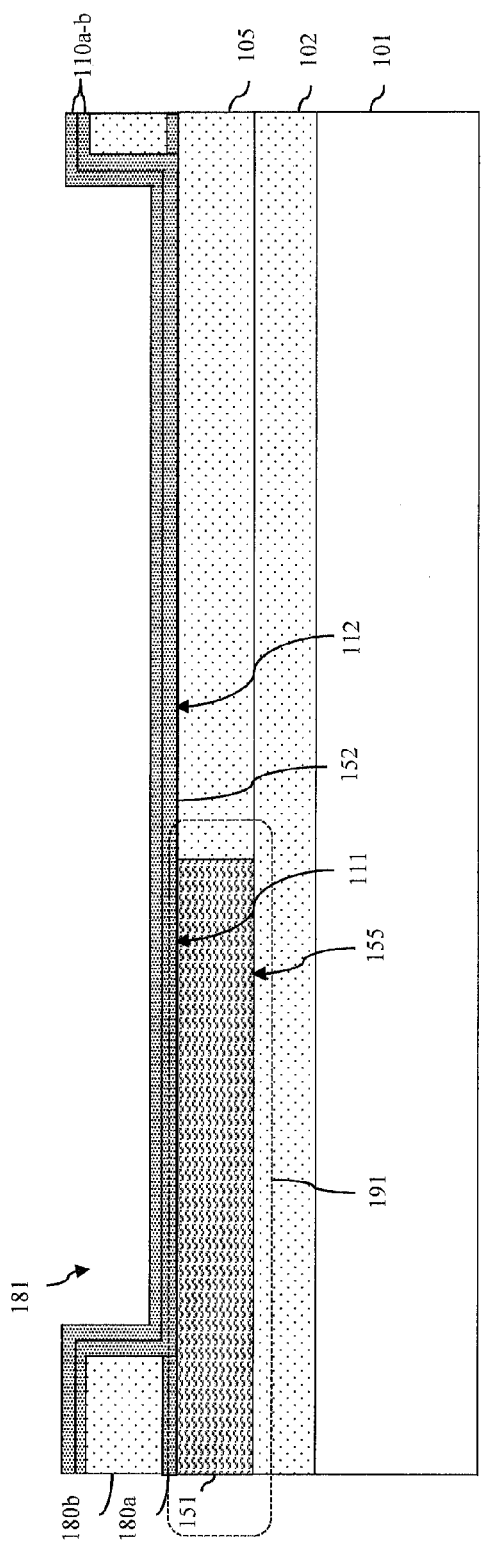
FIG. 11 is a cross-section diagram illustrating a partially completed structure formed according to the method of FIG. 7.

At least one protective layer 180a-b can be formed so as to cover the semiconductor core 151 and adjacent isolation region 105 (706, see FIG. 9). These protective layer(s) can comprise, for example, a protective nitride layer 180a and a protective oxide layer 180b on the protective nitride layer 180a. An opening 181 can subsequently be formed (e.g., lithographically patterned and etched) in the protective layer(s) 180a-b so as to expose one end 155 only of the semiconductor core 151 and the portion of the isolation region 105 adjacent to that end 155 (708, see FIGS. 10A-10B). Then, multiple dielectric layers to be used in patterning a dielectric core 152 of a second optical waveguide 192 and dielectric fins 153 of a grating coupler 193 can be deposited over the protective layer(s) 180a-b and in the opening 181 (710). The multiple dielectric layers can comprise at least one layer 110a-b of a second dielectric material (see FIG. 11). This second dielectric material can be different from the first dielectric material and, specifically, can have a refractive index that is higher than that of the first dielectric material and lower than that of the semiconductor material of the semiconductor core. Thus, for example, if the semiconductor material of the semiconductor core 151 comprises silicon, which has a refractive index of approximately 3.5 and the first dielectric material of the insulator layer 102 and the isolation region 105 comprises silicon dioxide, which has a refractive index of approximately 1.45, the second dielectric material can comprise silicon nitride, which has a refractive index of approximately 2.0. For illustration purposes, two layers 110a and 110b of the second dielectric material are shown; however, it should be understood that any number one or more layers of the second dielectric material could be deposited. In any case, the layer(s) 110a-b can have a first section 111 on and, particularly, above and immediately adjacent to the end 155 of the semiconductor core 151 and a second section 112 that extends laterally from the first section 111 onto and, particularly, above and immediately adjacent to, the portion of the isolation region 105 that is adjacent to and in end-to-end alignment with that end 155. The multiple dielectric layers can further comprise a layer 120 of the first dielectric material on the layer(s) 110a-b of the second dielectric material of the dielectric core 152 and, on the layer 120 of the first dielectric material, additional layers of the second dielectric material (as discussed in greater detail below).

Figure 12:
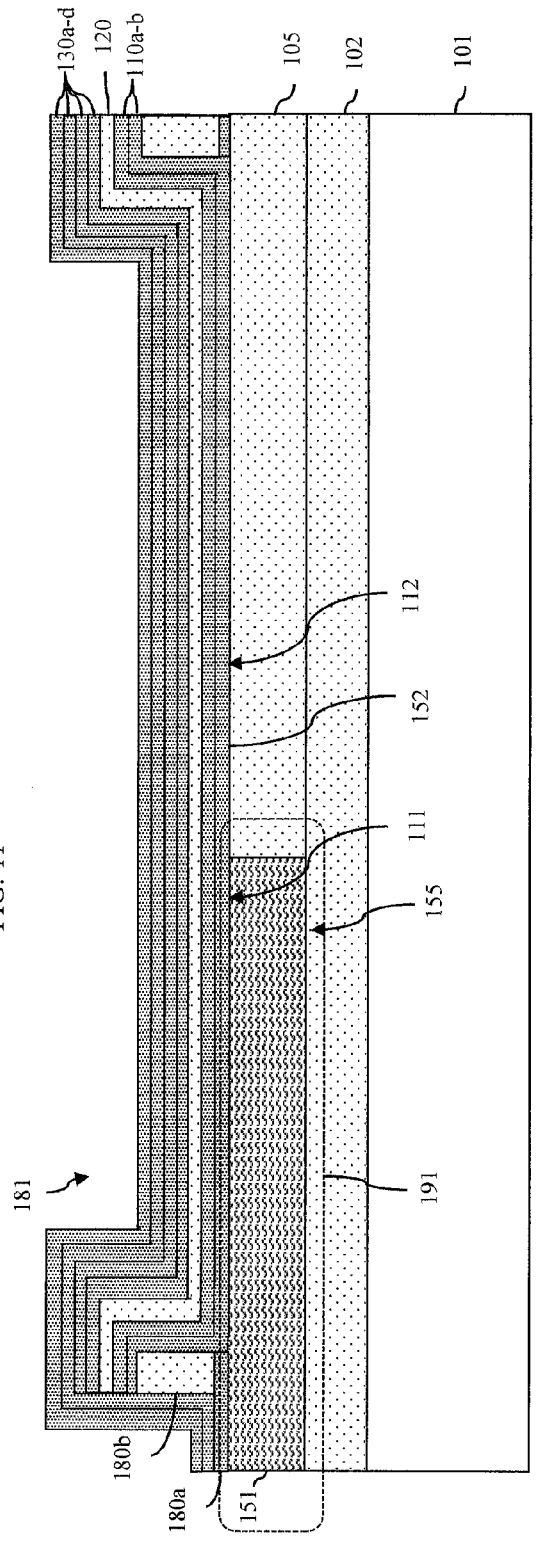
FIG. 12 is a cross-section diagram illustrating a partially completed structure formed according to the method of FIG. 7.

More specifically, in the method of forming the optoelectronic integrated circuit structure 100A of FIG. 1, at least three additional layers (e.g., four additional layers 130a-d) of the second dielectric material can be formed above the layer 120 of the first dielectric material within the opening 181 at process 710 (see FIG. 12). It should be noted that, while the layers 110a-b and 130a-d comprise the same second dielectric material, they can be deposited at process 710 so as to have different physical properties. For example, they can be deposited so as to have one or more of these layers can have different film stresses, different thicknesses, different indices of refraction that are greater than the index of refraction of the first dielectric material and less than that of the semiconductor material of the semiconductor core 151. It should also be noted that additional processing being performed concurrently elsewhere on the SOI wafer (e.g., complementary metal oxide semiconductor (CMOS) device processing and/or germanium photodetector processing) may require the formation of an additional opening in one or more of the protective layer(s) 180a-b either before or after deposition of any one or more of the additional layers 130a-d of the second dielectric material at process 710. For example, as illustrated in FIG. 12, after deposition of two additional layers 130a-b of the second dielectric material, an additional opening can be formed above the semiconductor core 151 and, particularly, above an end of the semiconductor core 151 opposite the end 155. This additional opening can extend through the additional layers 130a-b, through the layer 120 of the first dielectric material, through the layers 110a-b of the second dielectric material and through the protective oxide layer 180b, thereby exposing the protective nitride layer 180a. After this additional opening is formed, the additional layers 130c-d of the second dielectric material can be deposited.

Figure 13:
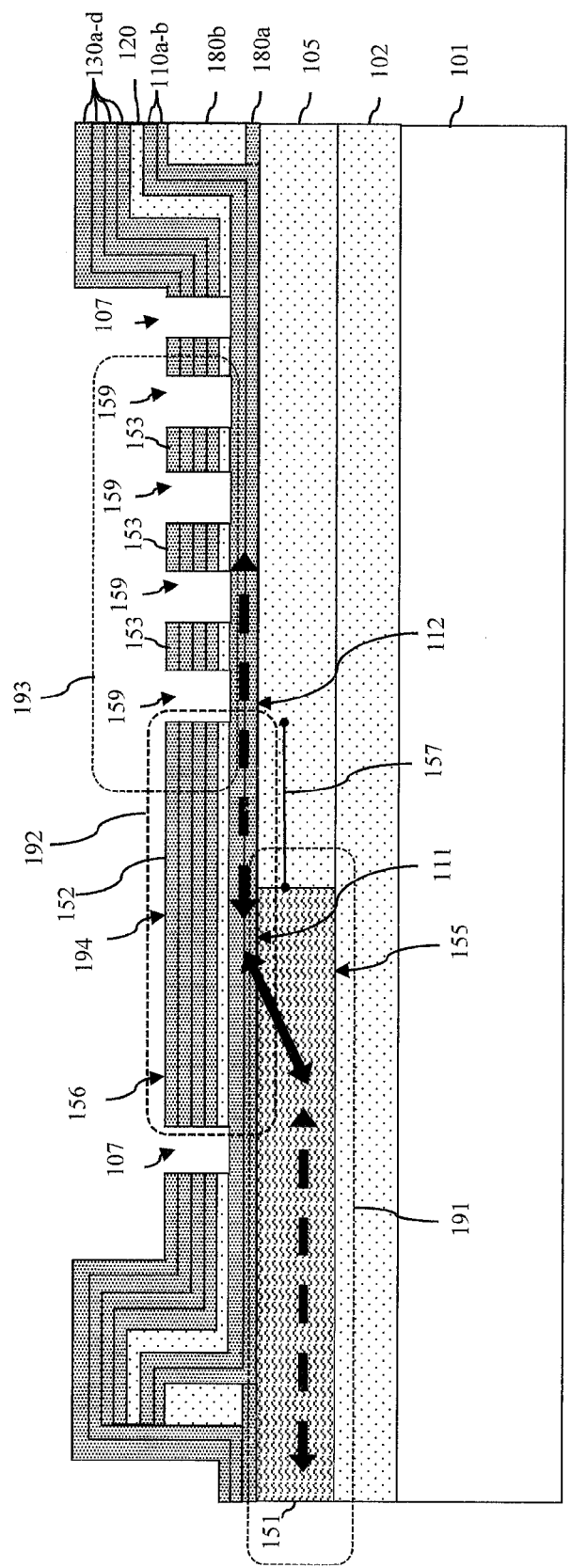
FIG. 13 is a cross-section diagram illustrating a partially completed structure formed according to the method of FIG. 7.

A trench 159 can subsequently be formed (e.g., lithographically patterned and etched) within the multiple dielectric layers in the opening 181 such that it extends vertically through the additional layers 130a-d of the second dielectric material and through the layer 120 of the first dielectric material to the top surface of the layer(s) 110a-b of the second dielectric material) (712, see FIG. 13). This trench 159 can be formed and, particularly, patterned so that it defines, for the dielectric core 152 of the second optical waveguide 192, a stack 194 of dielectric layers that are on the first section 111 and that further extend laterally onto the second section 112 of the layer(s) 110a-b of the second dielectric material. The trench 159 can further be formed and, particularly, patterned so that it also defines, for the grating coupler 193, multiple dielectric fins 153 that are on the second section 112 of the layer(s) 110a-b of the second dielectric material above the isolation region 105, that are essentially perpendicularly oriented relative to the stack 194 of dielectric layers and the end 155 of the semiconductor core 151, and that are spaced some distance 157 from the end 155 of the semiconductor core 151. It should be noted that, although not shown, the layer 120 of the first dielectric material within each of the dielectric fins 153 and/or within the stack 194 may be relatively narrow as compared to additional layers of the second dielectric material above due to etchback of the first dielectric material that may occur during processing.

After the trench 159 is formed, a blanket layer 140 of a third dielectric material can be formed over the stack 194 of dielectric layers and over the dielectric fins 153 (714, see FIG. 1). The third dielectric material of the blanket layer 140 can be different than the first and second dielectric materials so that it may function as cladding material for the second optical waveguide 192. Specifically, this third dielectric material can have a refractive index that is less than the composite refractive index of all the dielectric layers in the dielectric core 152, including the layer(s) 110a-b and the stack 194 of dielectric layers above the layer(s) 110a-b. For example, this third dielectric material can comprise a conventional interlayer dielectric material such as borophosphosilicate glass (BPSG), phosphosilicate glass (PSG), boron silicate glass (BSG), or undoped silicate glass (USG).

During the processes 712-714 of forming of the trench 159 to define the stack 194 of dielectric layer for the dielectric core 152 of the second optical waveguide 192 and the multiple dielectric fins 153 of the grating coupler 193 and of forming the blanket layer 140 of the third dielectric material, a signal propagation termination region 106 for the second optical waveguide 192, as shown in the optoelectronic integrated circuit structure 100A of FIG. 1, can concurrently be formed. To form this signal propagation termination region 106, an additional trench 107 can be formed at process 712 such that it extends vertically through the stack 194 of dielectric layers (i.e., through the additional layers 130a-d of the second dielectric material and the layer 120 of the first dielectric material) to the top surface of the layer(s) 110a-b of the second dielectric material (see FIG. 13). This additional trench 107 can further be patterned such that it defines the shape of the dielectric core 152. Then, at process 714, this additional trench 107 can be filled with the third dielectric material of the blanket layer 140 (see FIG. 1). Since, as mentioned above, the third dielectric material of the blanket layer 140 functions as cladding material for the second optical waveguide 192, the signal propagation termination region 106 will limit (e.g., terminate, prevent, etc.) light signal propagation beyond the dielectric core 152, thereby defining the outer boundaries of the second optical waveguide 192. See FIG. 4 and the discussion above regarding the possible shapes for and relative positions of the signal propagation termination region 106, the dielectric core 152 of the second optical waveguide 192, as defined by the signal propagation termination region 106, the semiconductor core 151 of the first optical waveguide 191 and the dielectric fins 153 of the grating coupler 193.

Figure 14:
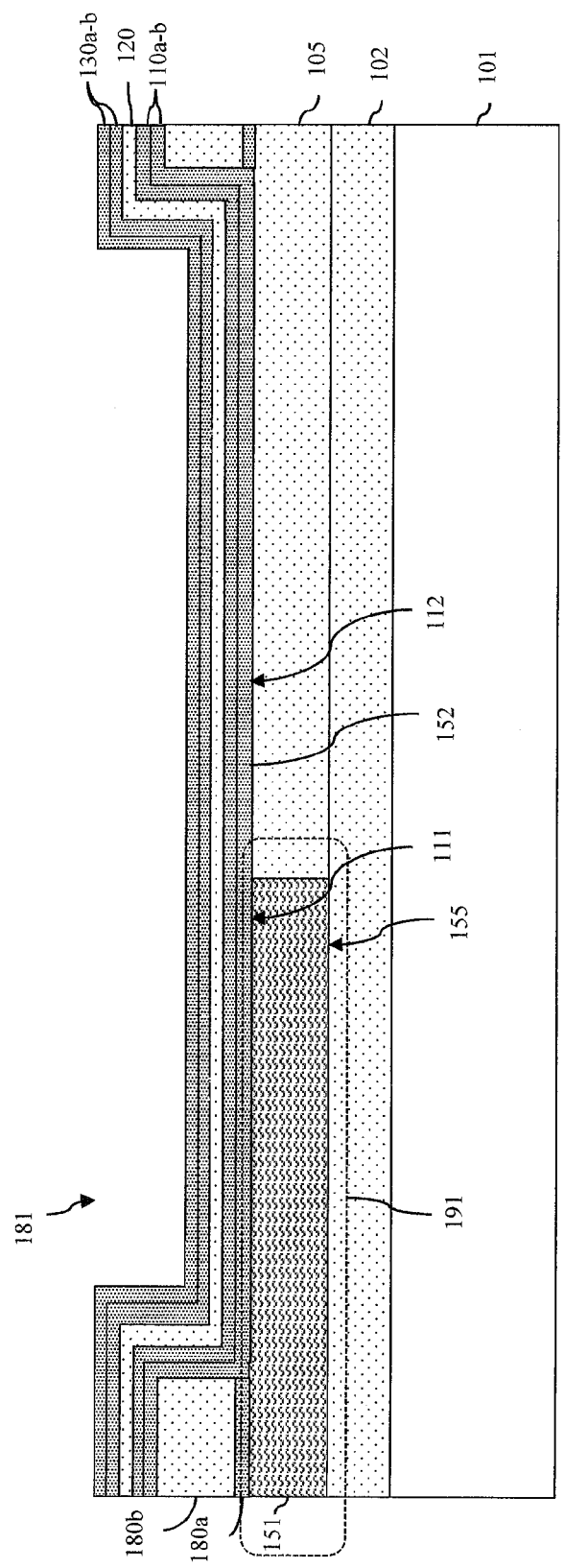
FIG. 14 is a cross-section diagram illustrating a partially completed structure formed according to the method of FIG. 7.
Figure 15:
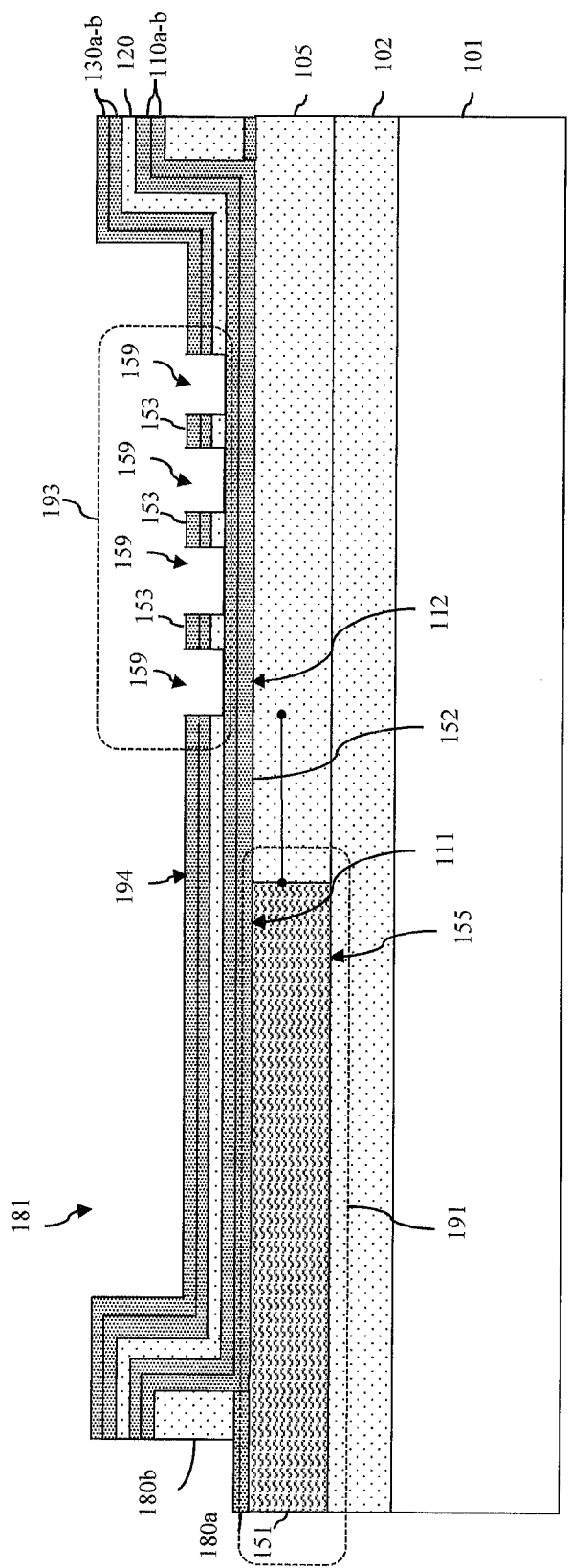
FIG. 15 is a cross-section diagram illustrating a partially completed structure formed according to the method of FIG. 7.

Alternatively, in the method of forming the optoelectronic integrated circuit structure 100B of FIG. 2, two additional layers 130a-b of the second dielectric material can be formed above the layer 120 of the first dielectric material within the opening 181 at process 710 (see FIG. 14). A trench 159 can subsequently be formed (e.g., lithographically patterned and etched) within the multiple dielectric layers in the opening 181 such that it extends vertically through the additional layers 130a-b of the second dielectric material and the layer 120 of the first dielectric material to the top surface of the layer(s) 110a-b of the second dielectric material (716, see FIG. 15). This trench 159 can be formed and, particularly, patterned such that it defines, for the dielectric core 152 of the second optical waveguide 192, a stack 194 of dielectric layers on the first section 111 and further extending laterally onto the second section 112 of the the layer(s) 110a-b of the second dielectric material. The trench 159 can further be formed and, particularly, patterned so that it also defines, for the grating coupler 193, multiple dielectric fins 153 that are on the second section 112 of the the layer(s) 110a-b of the second dielectric material above the isolation region 105, that are essentially perpendicularly oriented relative to the stack 194 of dielectric layers and the end 155 of the semiconductor core 151, and that are spaced some distance 157 from the end 155 of the semiconductor core 151. It should be noted that additional processing being performed concurrently elsewhere on the SOI wafer (e.g., complementary metal oxide semiconductor (CMOS) device processing and/or germanium photodetector processing) may require the formation of an additional opening in one or more of the protective layer(s) 180a-b either before or after formation of the trench at process 716. For example, prior to formation of the trench 159, a mask could be formed over the multiple dielectric layers within the opening 181, then an additional opening can be formed above the semiconductor core 151 and, particularly, above an end of the semiconductor core 151 opposite the end 155. This additional opening can extend through the additional layers 130a-b, through the layer 120 of the first dielectric material, through the layers 110a-b of the second dielectric material and through the protective oxide layer 180b, thereby exposing the protective nitride layer 180a. After this additional opening is formed, the mask over the multiple dielectric layers within the opening could be removed and the trench 159 could be formed.

Figure 16:
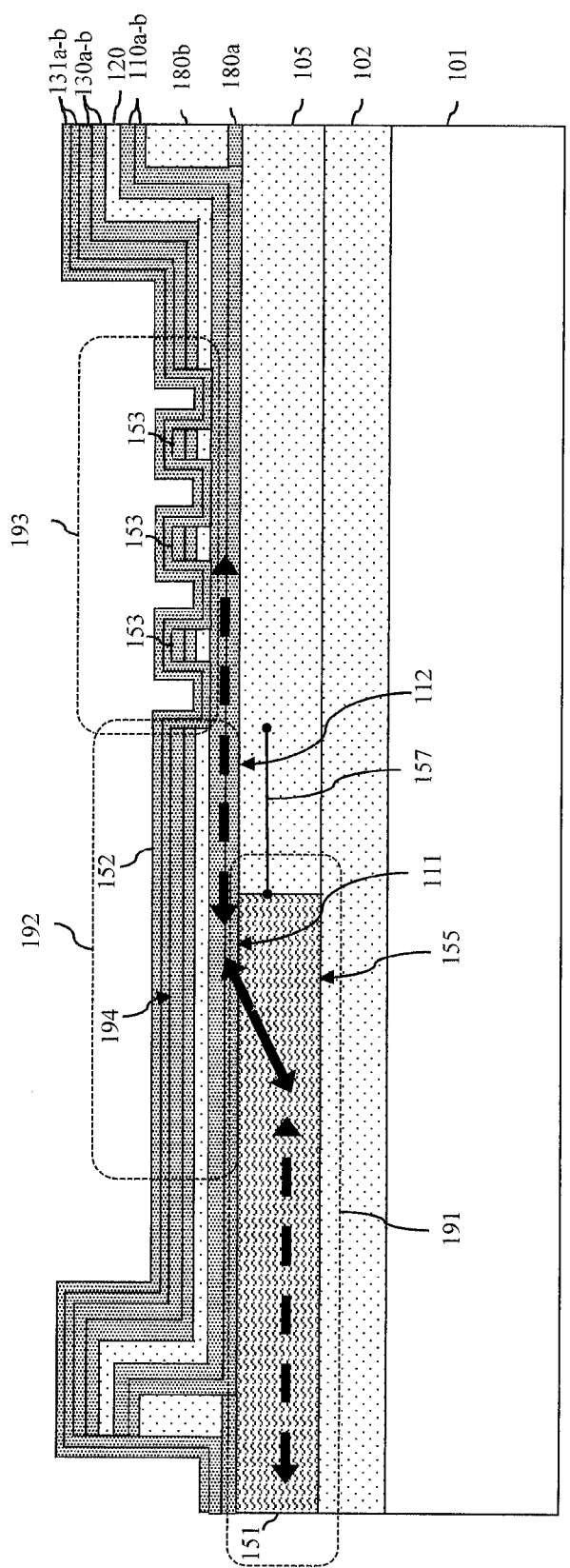
FIG. 16 is a cross-section diagram illustrating a partially completed structure formed according to the method of FIG. 7.
Figure 17:
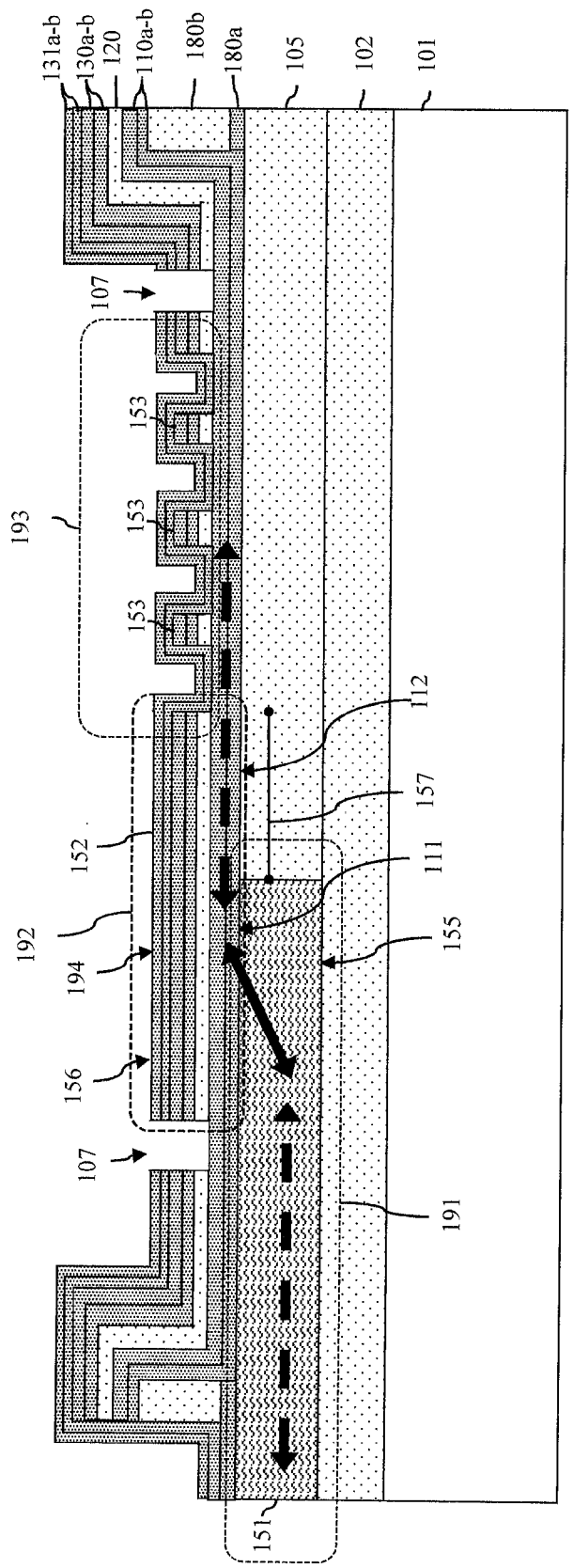
FIG. 17 is a cross-section diagram illustrating a partially completed structure formed according to the method of FIG. 7.

After forming the trench 159 (i.e., after defining the stack 194 of dielectric layers for the dielectric core 152 of the second optical waveguide and the dielectric fins 153 of the grating coupler), at least one conformal layer (e.g., two conformal layers 131a-b) of the second dielectric material can be formed (i.e., conformally deposited) over the stack 194 of dielectric layers and the dielectric fins 153 (718, see FIG. 16). It should be noted that, while the layers 110a-b, 130a-b and 131a-b comprise the same second dielectric material, they can be deposited at processes 710 and 718 so that they have different physical properties. For example, they can be deposited so as to have one or more of these layers can have different film stresses, different thicknesses, different indices of refraction that are greater than the index of refraction of the first dielectric material and less than that of the semiconductor material of the semiconductor core 151. Subsequently, an additional trench 107 for a signal propagation termination region of the second optical waveguide 192 can be formed (e.g., lithographically patterned and etched) (720, see FIG. 17). This additional trench 107 can be formed such that it extends vertically through the conformal layer(s) 131a-b of the second dielectric material, through the additional layers 130a-b of the second dielectric material and further through the layer 120 of the first dielectric material to the top surface of the layer(s) 110a-b of the second dielectric material. This additional trench 107 can be formed and, particularly, patterned such that it defines the shape of the dielectric core 152. After the additional trench 107 is formed, a blanket layer 140 of a third dielectric material can be formed on the conformal layer(s) 131a-b of the second dielectric material over the stack 194 of dielectric layers and dielectric fins 153 and filling the additional trench 107, thereby completing the signal propagation termination region 106 (722, see FIG. 2). The third dielectric material of the blanket layer 140 can be different than the first and second dielectric materials so that it may function as cladding material for the second optical waveguide 192. Specifically, this third dielectric material can have a refractive index that is less than the composite refractive index of all the dielectric layers in the dielectric core 152, including the layer(s) 110a-b, the stack 194 of dielectric layers above the layer(s) 110a-b and the portion of the conformal layer(s) 131a-b above the stack 194. For example, this third dielectric material can comprise a conventional interlayer dielectric material such as borophosphosilicate glass (BPSG), phosphosilicate glass (PSG), boron silicate glass (BSG), or undoped silicate glass (USG). It should be noted that the signal propagation termination region 106 in the optoelectronic integrated circuit structure 100B can be formed so as that the dielectric core 152 has essentially the same shape and/or positioning as that described above with respect to the optoelectronic integrated circuit structure 100B and illustrated in FIG. 4.

Figure 18:
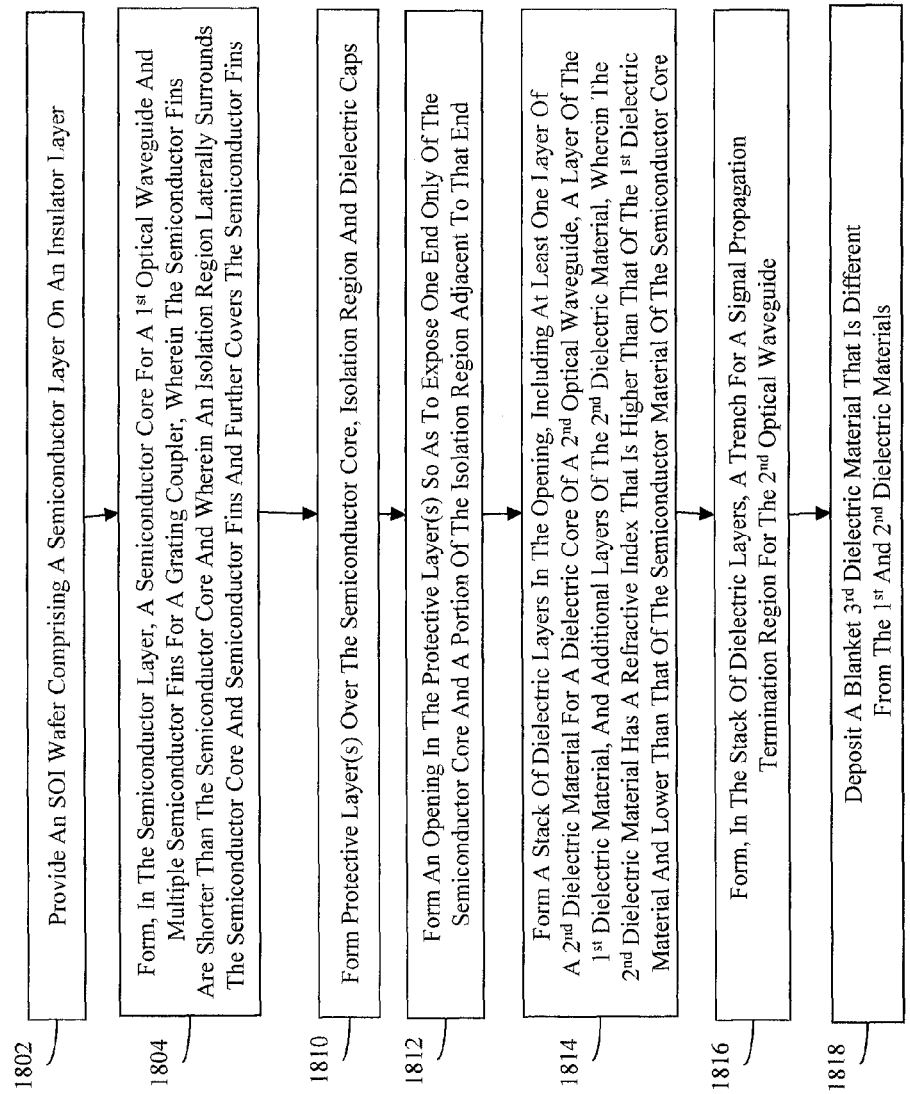
FIG. 18 is a flow diagram illustrating a method of forming the structure of FIG. 5.
Figure 21:
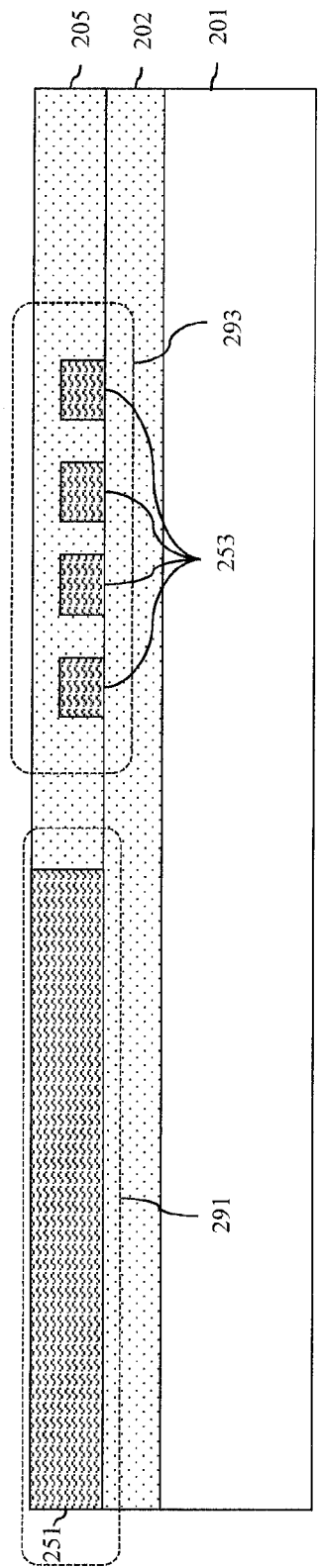
FIG. 21 is a cross-section diagram illustrating a partially completed structure formed according to the method of FIG. 18.

Referring to FIG. 18, also disclosed herein is a method of forming the optoelectronic integrated circuit structure 200 of FIG. 5, which incorporates a first optical waveguide 291, having a semiconductor core 251, indirectly coupled to a grating coupler 293 through a second optical waveguide 292, having a dielectric core 252 (e.g., a silicon nitride core), wherein the grating coupler 293 comprises multiple semiconductor fins 253. This method can comprise providing a semiconductor-on-insulator (SOI) wafer (1802). This SOI wafer can comprise a semiconductor substrate 201 (e.g., a silicon substrate), an insulator layer 202 on the semiconductor substrate 201 and a semiconductor layer (e.g., a silicon layer) on the insulator layer 202. The insulator layer 202 can comprise a first dielectric material. The method can further comprise forming, in the semiconductor layer, a semiconductor core 251 for a first optical waveguide and multiple semiconductor fins 253 for a grating coupler, wherein the semiconductor fins 253 are shorter than the semiconductor core 251 and wherein the semiconductor core 251 and semiconductor fins 253 are laterally surrounded by an isolation region 205 and the semiconductor fins 253 are further covered by that isolation region (1804).

Specifically, at process 1804, a trench can be formed (e.g., lithographically patterned and etched) in the semiconductor layer above the insulator layer 202 so as to define a semiconductor core 251 (e.g., a silicon core) for a first optical waveguide 291 and so as to also define multiple semiconductor fins 253 (e.g., silicon fins) of a grating coupler 293, wherein the semiconductor fins 253 are perpendicularly oriented relative to an end 255 of the semiconductor core 251 and adjacent to, but spaced some distance 257 from, that end 255 (see FIG. 19). Next, the semiconductor fins 253 can be recessed (i.e., etched back) such that they are shorter in height than the semiconductor core 251 (see FIG. 20). Specifically, a mask can be formed over the semiconductor core 251 and an etch process can be performed to recess (i.e., shorten) the semiconductor fins 253 such that the semiconductor core 251 has a first height 208 and the semiconductor fins 253 have a second height 209 that is less than the first height 208. Then, the mask can be removed. A blanket layer of the first dielectric material can then be deposited over the semiconductor core 251 and semiconductor fins 253 and a chemical mechanical polishing (CMP) process can be performed so as to expose the top surface of the semiconductor core 251, thereby forming an isolation region 205, which comprises the first dielectric material, which laterally surrounds the semiconductor core 251 and each of the semiconductor fins 253 and which covers the semiconductor fins 253. Optionally, prior to deposition of the blanket layer of the first dielectric material to form the isolation region 205, a conformal layer of a second dielectric material (not shown) can be deposited over the semiconductor core 251 and semiconductor fins 253 in order to physically separate the semiconductor core 251 and the semiconductor fins 253 from the isolation region 205 in the resulting structure 200. The second dielectric material can, as discussed in greater detail below, be different from the first dielectric material and can be used to reduce device current leakages by inhibiting the diffusion of dopants and/or passivating surface states on the sidewalls of the semiconductor core 251 and semiconductor fins 253. It should be noted that the semiconductor core 251 can be defined at process 1804 such that it is essentially rectangular in shape, as shown in FIG. 6A. Alternatively, the semiconductor core 251 can be defined at process 1804 so that it has at least one end 255 that is tapered, as shown in FIG. 6B. In any case, the first dielectric material used for the insulator layer 202 and isolation region 205 can specifically comprise a dielectric material that has a lower refractive index than the semiconductor material of the semiconductor core 251. Thus, for example, if the semiconductor material of the semiconductor core 251 comprises silicon, which has a refractive index of approximately 3.5, then the first dielectric material of the insulator layer 202 and isolation region 205 can comprise silicon dioxide, which has a refractive index of approximately 1.45.

Figure 22:
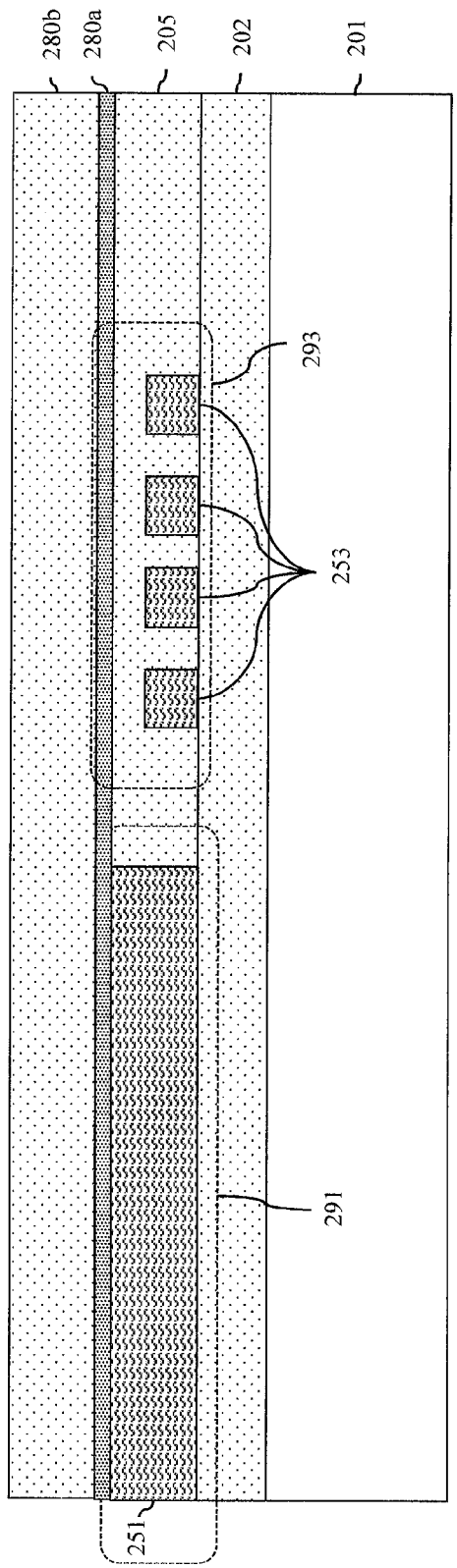
FIG. 22 is a cross-section diagram illustrating a partially completed structure formed according to the method of FIG. 18.
Figure 24:
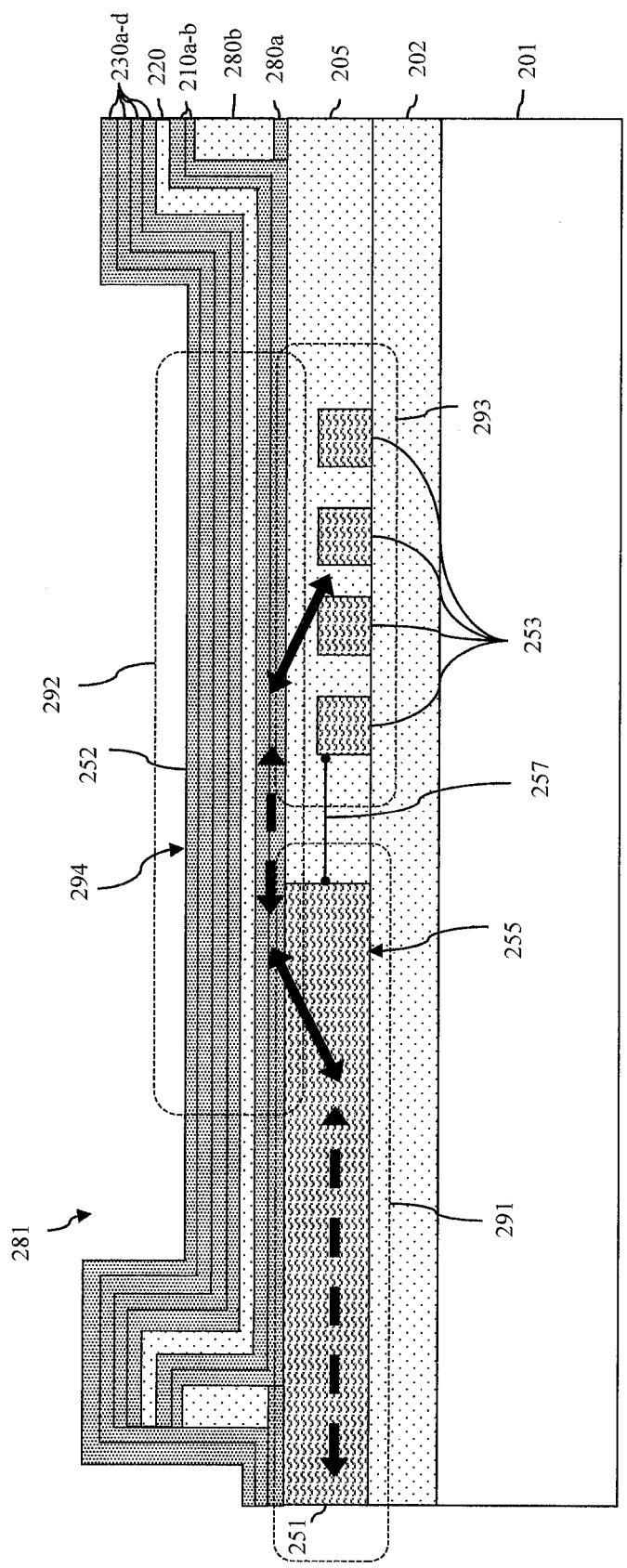
FIG. 24 is a cross-section diagram illustrating a partially completed structure formed according to the method of FIG. 18.

Following process 1804, at least one protective layer 280a-b can be formed above the semiconductor core 251 and the isolation region 205 (1810, see FIG. 22). These protective layer(s) can comprise, for example, a protective nitride layer 280a and a protective oxide layer 280b on the protective nitride layer 280a. An opening 281 can subsequently be formed (e.g., lithographically patterned and etched) in the protective layer(s) 280a-b so as to expose one end 255 only of the semiconductor core 251 and the portion of the isolation region 205 adjacent to that end 255 and containing (i.e., laterally surrounding and covering) the semiconductor fins 253 (1812, see FIGS. 23A-23B). Then, multiple dielectric layers 294 for a dielectric core 252 of a second optical waveguide 292 can be deposited over the protective layer(s) 280a-b and in the opening 281 (1814, see FIG. 24). The multiple dielectric layers 294 can comprise at least one layer 210a-b of a second dielectric material. This second dielectric material can be different from the first dielectric material and, specifically, can have a refractive index that is higher than that of the first dielectric material and lower than that of the semiconductor material of the semiconductor core 251. Thus, for example, if the semiconductor material of the semiconductor core 251 comprises silicon, which has a refractive index of approximately 3.5 and the first dielectric material of the insulator layer 202 and the isolation region 205 comprises silicon dioxide, which has a refractive index of approximately 1.45, the second dielectric material can comprise silicon nitride, which has a refractive index of approximately 2.0. For illustration purposes, two layers 210a and 210b of the second dielectric material are shown; however, it should be understood that any number one or more layers of the second dielectric material could be deposited for the dielectric core 252 of the second optical waveguide 292. The multiple dielectric layers 294 can further comprise a layer 220 of the first dielectric material on the layer(s) 210a-b of the second dielectric material and, on the layer 220 of the first dielectric material, additional layers of the second dielectric material (as discussed in greater detail below). For example, in the method of forming the optoelectronic integrated circuit structure 200 of FIG. 5, at least three additional layers (e.g., four additional layers 230a-d, as illustrated in FIG. 24) of the second dielectric material can be formed above the layer 220 of the first dielectric material within the opening 281 at process 1814. Thus, an end 255 of the semiconductor core 251 of the first optical waveguide 291 will be overlaid by and in direct contact with an adjacent end 256 of the dielectric core 252 of the second optical waveguide 292. As mentioned above, the layer(s) 210a-b of the second dielectric material and the additional layers 230a-d of the second dielectric material comprise the same second dielectric material (e.g., silicon nitride). However, it should be noted that any one or more of these layers of the second dielectric material can be deposited at process 1814 so as to have different physical properties. For example, one or more of these layers can be deposited so as to have different film stresses, different thicknesses, different indices of refraction that are greater than the index of refraction of the first dielectric material and less than that of the semiconductor material of the semiconductor core 251.

It should further be noted that additional processing being performed concurrently elsewhere on the SOI wafer (e.g., complementary metal oxide semiconductor (CMOS) device processing and/or germanium photodetector processing) may require the formation of an additional opening in one or more of the protective layer(s) 280a-b either before or after deposition of any one or more of the additional layers 230a-d of the second dielectric material at process 1810. For example, as illustrated in FIG. 24, after deposition of two additional layers 230a-b of the second dielectric material, an additional opening can be formed above the semiconductor core 251 and, particularly, above an end of the semiconductor core 251 opposite the end 255. This additional opening can extend through the additional layers 230a-b, through the layer 220 of the first dielectric material, through the layers 210a-b of the second dielectric material and through the protective oxide layer 280b, thereby exposing the protective nitride layer 280a. After this additional opening is formed, the additional layers 230c-d of the second dielectric material can be deposited.

Figure 25:
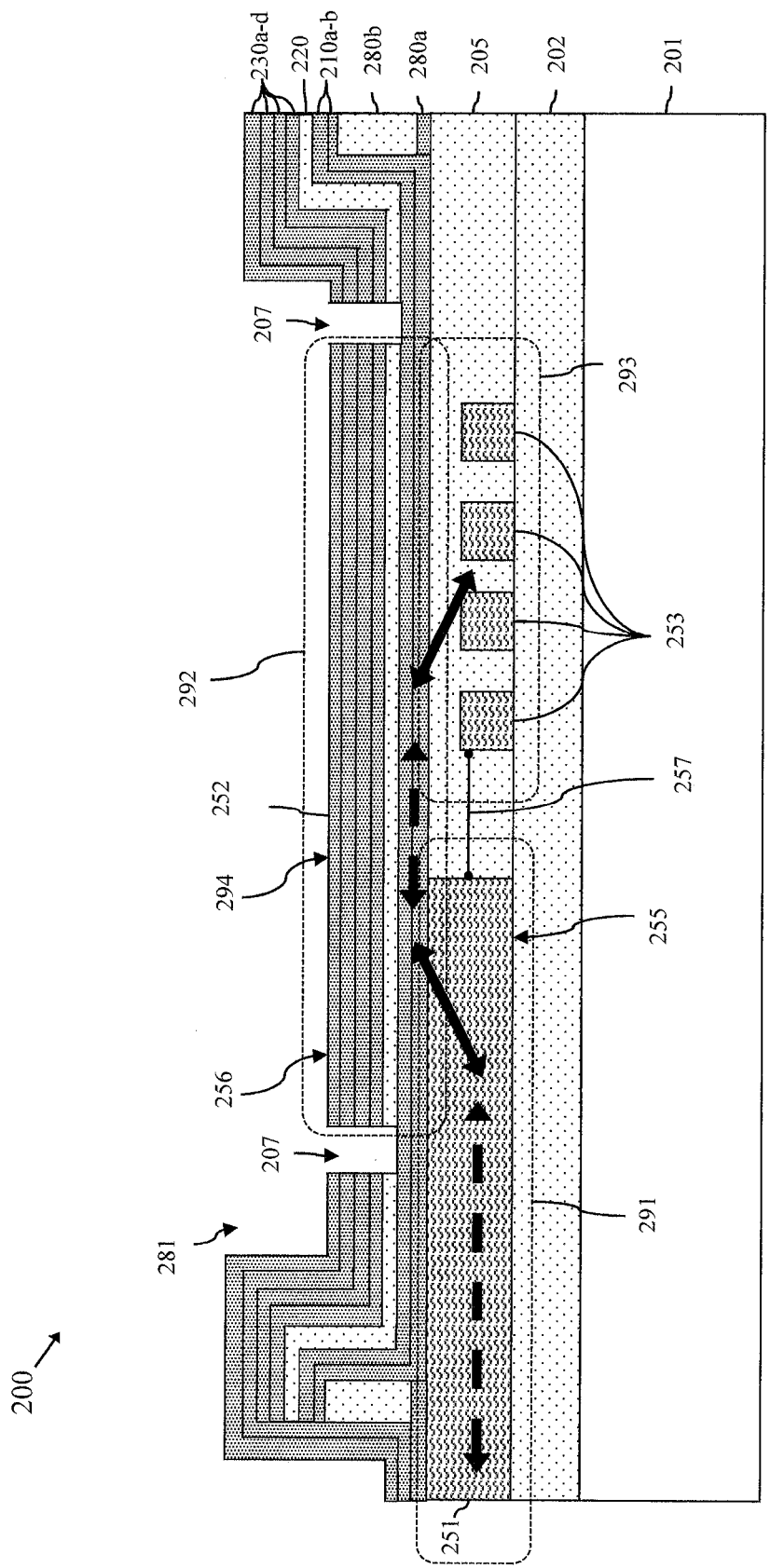
FIG. 25 is a cross-section diagram illustrating a partially completed structure formed according to the method of FIG. 18.

Subsequently, a trench 207 for a signal propagation termination region 206 of the second optical waveguide 292 can be formed (e.g., lithographically patterned and etched) (1816, see FIG. 25). This trench 207 can be formed such that it extends vertically through the additional layers 230a-d of the second dielectric material and further through the layer 220 of the first dielectric material to the top surface of the layer(s) 210a-b of the second dielectric material. This trench 207 can be formed and, particularly, patterned so as to define the shape of the dielectric core 252. After the trench 207 is formed, a blanket layer 240 of a third dielectric material can be formed on over the multiple dielectric layers 294 and filling the trench 207, thereby completing the signal propagation termination region 206 (1818, see FIG. 5). The third dielectric material of the blanket layer 240 can be different than the first and second dielectric materials so that it may function as cladding material for the second optical waveguide 292. Specifically, this third dielectric material can have a refractive index that is less than the composite refractive index of all the dielectric layers in the dielectric core 252, including the layer(s) 210a-b, 220 and 230a-d. For example, this third dielectric material can comprise a conventional interlayer dielectric material such as borophosphosilicate glass (BPSG), phosphosilicate glass (PSG), boron silicate glass (BSG), or undoped silicate glass (USG). Since the third dielectric material of the blanket layer 240 functions as cladding material for the second optical waveguide 292, the signal propagation termination region 206 will limit (e.g., terminate, prevent, etc.) light signal propagation beyond the dielectric core 252, thereby defining the outer boundaries of the second optical waveguide 292. See FIG. 4 and the discussion above regarding the possible shapes for and relative positions of the signal propagation termination region 206, the dielectric core 252 of the second optical waveguide 292, as defined by the signal propagation termination region 206, the semiconductor core 251 of the first optical waveguide 291 and the semiconductor fins 253 of the grating coupler 293.

The above-described methods set forth in the flow diagrams of FIGS. 7 and 18 of forming the optoelectronic integrated circuit structures 100A-100B of FIGS. 1-2 and 200 of FIG. 5, respectively, can be readily integrated with current optoelectronic integrated circuit processing, including complementary metal oxide semiconductor (CMOS) device processing and germanium photodetector processing. For example, active regions for complementary metal oxide semiconductor (CMOS) devices elsewhere on the SOI wafer can be defined by the formation of isolation regions in the semiconductor layer during the same process step wherein the semiconductor core 151, 251 is similarly defined by the formation of an isolation region 105, 205 (see process step 704 of FIG. 7 and process step 1804 of FIG. 18, as described above). The protective layer(s) formed to protect those active regions during subsequent processing can be the same protective layer(s) 180a-b, 280a-b formed above the semiconductor core 151, 251 and adjacent isolation region 105, 205 (see process step 706 of FIG. 7 and process step 1810 of FIG. 18). Furthermore, the dielectric layers deposited before and after germanium photodetector formation elsewhere on the SOI wafer in order to encapsulate that germanium photodetector can the same dielectric layers deposited within the opening 181, 281 in the protective layer(s) 180a-b, 280a-b.

It should be understood that the Figures and descriptions of the methods of forming optoelectronic integrated circuit structures 100A, 100B and 200 are not intended to be limiting. For example, for illustration purposes, only four essentially parallel fins 153, 253 are shown as being formed for the grating coupler 193, 293. However, it should be understood that the number of essentially parallel fins 153, 253 formed for the grating coupler 193, 293 should be a sufficient number (e.g., 5, 10, 20, etc.) to ensure that those fins can diffract optical signals (i.e., light signals) between an off-chip optical device 195, 295 (e.g., an optical fiber) above and the dielectric core 152, 252 of the second optical waveguide 192, 292, as discussed above. Furthermore, these fins 153, 253 can be formed so as to have the same length and same width, as shown. However, alternatively, these fins 153, 253 can be formed so as to have different lengths and/or different widths. Also, for example, additional process steps, which were not described or shown in the Figures, can include the formation of one or more additional reflectors (i.e., mirrors) below the grating coupler 193, 293. Such additional reflectors can comprise, for example, metal reflectors comprise any of aluminum, tungsten, copper, gold, silver, any other suitable reflective metal or alloys thereof.

The method as described above is used in the fabrication of integrated circuit chips. The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

Figure 26:
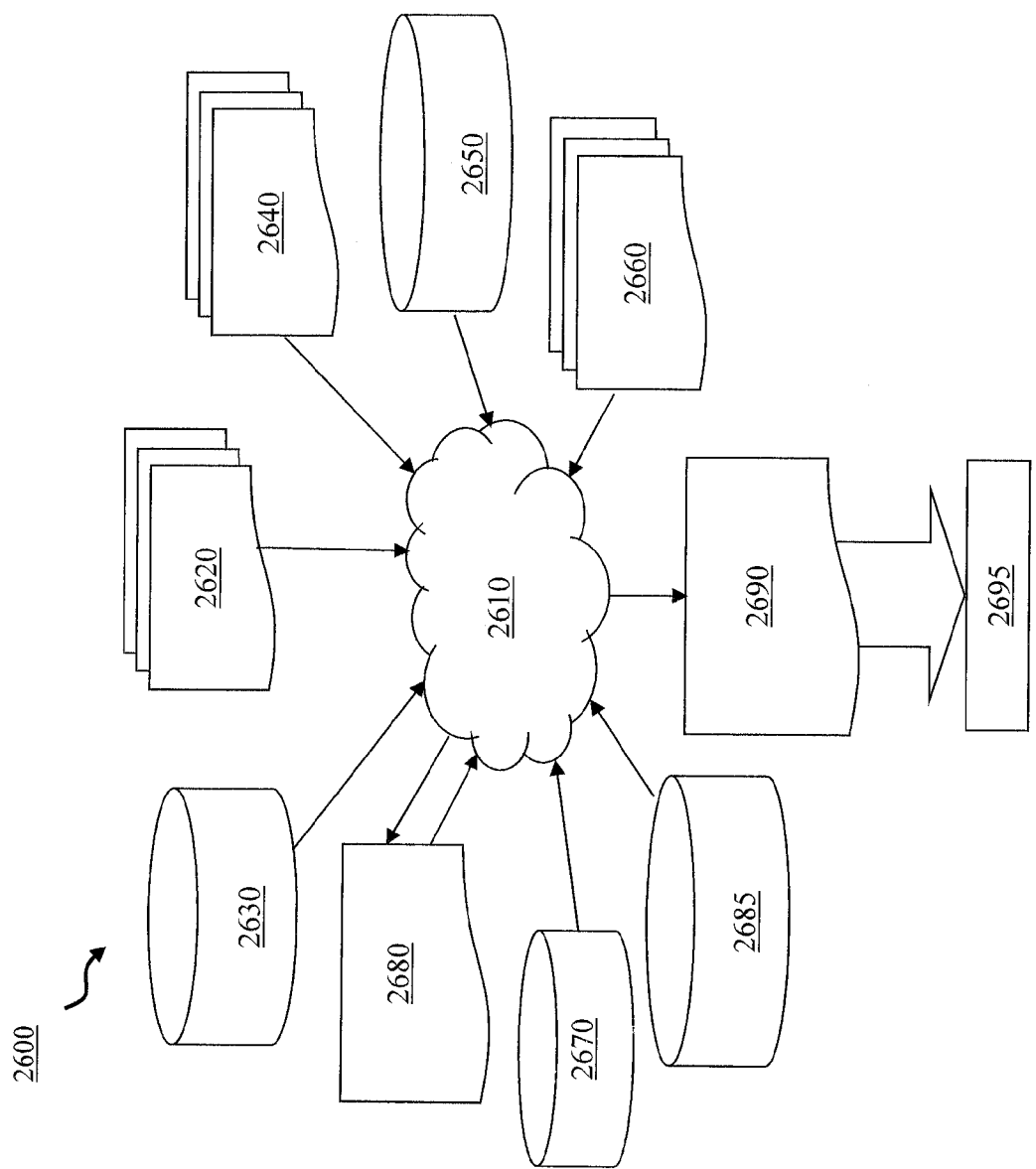
FIG. 26 is a block diagram illustrating an exemplary design flow used, for example, in the logic design, simulation, test, layout, and manufacture of the structures disclosed herein.

FIG. 26 shows a block diagram of an exemplary design flow 2600 used for example, in semiconductor IC logic design, simulation, test, layout, and manufacture. Design flow 2600 includes processes, machines and/or mechanisms for processing design structures or devices to generate logically or otherwise functionally equivalent representations of the design structures and/or devices described above and shown in FIGS. 1-2 and 5. The design structures processed and/or generated by design flow 2600 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 2600 may vary depending on the type of representation being designed. For example, a design flow 2600 for building an application specific IC (ASIC) may differ from a design flow 2600 for designing a standard component or from a design flow 2600 for instantiating the design into a programmable array, for example a programmable gate array (PGA) or a field programmable gate array (FPGA) offered by Altera® Inc. or Xilinx® Inc.

FIG. 26 illustrates multiple such design structures including an input design structure 2620 that is preferably processed by a design process 2610. Design structure 2620 may be a logical simulation design structure generated and processed by design process 2610 to produce a logically equivalent functional representation of a hardware device. Design structure 2620 may also or alternatively comprise data and/or program instructions that when processed by design process 2610, generate a functional representation of the physical structure of a hardware device. Whether representing functional and/or structural design features, design structure 2620 may be generated using electronic computer-aided design (ECAD) such as implemented by a core developer/designer. When encoded on a machine-readable data transmission, gate array, or storage medium, design structure 2620 may be accessed and processed by one or more hardware and/or software modules within design process 2610 to simulate or otherwise functionally represent an electronic component, circuit, electronic or logic module, apparatus, device, or system such as those shown in FIGS. 1-2 and 5. As such, design structure 2620 may comprise files or other data structures including human and/or machine-readable source code, compiled structures, and computer executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 2610 preferably employs and incorporates hardware and/or software modules for synthesizing, translating, or otherwise processing a design/simulation functional equivalent of the components, circuits, devices, or logic structures shown in FIGS. 1-2 and 5 to generate a Netlist 2680 which may contain design structures such as design structure 2620. Netlist 2680 may comprise, for example, compiled or otherwise processed data structures representing a list of wires, discrete components, logic gates, control circuits, I/O devices, models, etc. that describes the connections to other elements and circuits in an integrated circuit design. Netlist 2680 may be synthesized using an iterative process in which netlist 2680 is resynthesized one or more times depending on design specifications and parameters for the device. As with other design structure types described herein, netlist 2680 may be recorded on a machine-readable data storage medium or programmed into a programmable gate array. The medium may be a non volatile storage medium such as a magnetic or optical disk drive, a programmable gate array, a compact flash, or other flash memory. Additionally, or in the alternative, the medium may be a system or cache memory, buffer space, or electrically or optically conductive devices and materials on which data packets may be transmitted and intermediately stored via the Internet, or other networking suitable means.

Design process 2610 may include hardware and software modules for processing a variety of input data structure types including Netlist 2680. Such data structure types may reside, for example, within library elements 2630 and include a set of commonly used elements, circuits, and devices, including models, layouts, and symbolic representations, for a given manufacturing technology (e.g., different technology nodes, 32 nm, 45 nm, 90 nm, etc.). The data structure types may further include design specifications 2640, characterization data 2650, verification data 2660, design rules 2670, and test data files 2685 which may include input test patterns, output test results, and other testing information. Design process 2610 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 2610 without deviating from the scope and spirit of the invention. Design process 2610 may also include modules for performing standard circuit design processes such as timing analysis, verification, design rule checking, place and route operations, etc.

Design process 2610 employs and incorporates logic and physical design tools such as HDL compilers and simulation model build tools to process design structure 2620 together with some or all of the depicted supporting data structures along with any additional mechanical design or data (if applicable), to generate a second design structure 2690. Design structure 2690 resides on a storage medium or programmable gate array in a data format used for the exchange of data of mechanical devices and structures (e.g. information stored in a IGES, DXF, Parasolid XT, JT, DRG, or any other suitable format for storing or rendering such mechanical design structures). Similar to design structure 2620, design structure 2690 preferably comprises one or more files, data structures, or other computer-encoded data or instructions that reside on transmission or data storage media and that when processed by an ECAD system generate a logically or otherwise functionally equivalent form of one or more of the embodiments of the invention shown in FIGS. 1-2 and 5. In one embodiment, design structure 2690 may comprise a compiled, executable HDL simulation model that functionally simulates the devices shown in FIGS. 1-2 and 5.

Design structure 2690 may also employ a data format used for the exchange of layout data of integrated circuits and/or symbolic data format (e.g. information stored in a GDSII (GDS2), GL1, OASIS, map files, or any other suitable format for storing such design data structures). Design structure 2690 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown in FIGS. 1-2 and 5. Design structure 2690 may then proceed to a stage 2695 where, for example, design structure 2690: proceeds to tape-out, is released to manufacturing, is released to a mask house, is sent to another design house, is sent back to the customer, etc.

Figure 27:
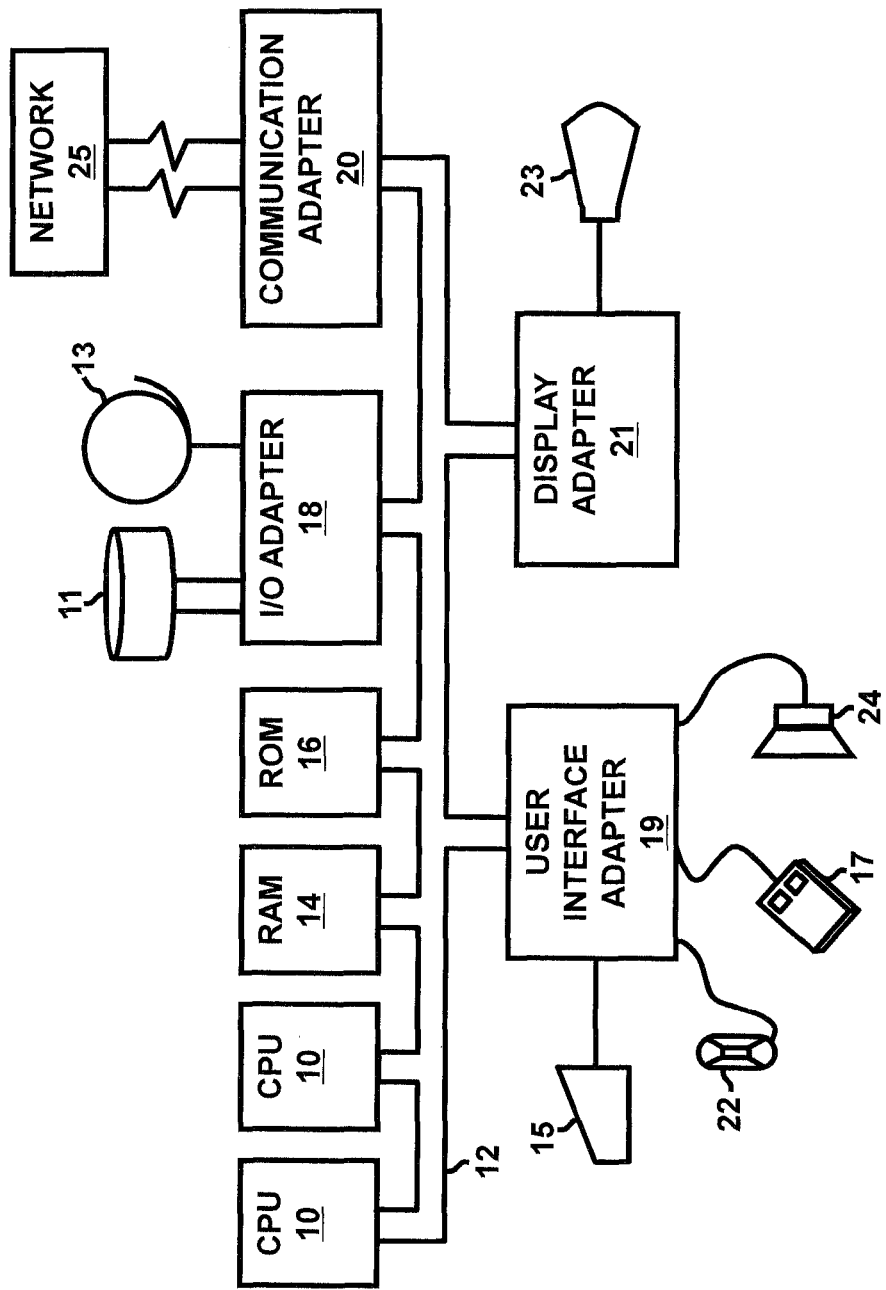
FIG. 27 is schematic diagram illustrating an exemplary computer system that can be used in the implementation of the design flow of FIG. 26.

A representative hardware environment (i.e., a computer system) for implementing the above described design flow is depicted in FIG. 27. This schematic drawing illustrates a hardware configuration of an information handling/computer system in accordance with the embodiments herein. The system comprises at least one processor or central processing unit (CPU) 10. The CPUs 10 are interconnected via a system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

It should be understood that the terminology used herein is for the purpose of describing the disclosed structures and methods and is not intended to be limiting. For example, as used herein, the singular forms "a", "an" and "the" are intended to include the plural forms as well, unless the context clearly indicates otherwise. Additionally, as used herein, the terms "comprises" "comprising", "includes" and/or "including" specify the presence of stated features, integers, steps, operations, elements, and/or components, but do not preclude the presence or addition of one or more other features, integers, steps, operations, elements, components, and/or groups thereof. Furthermore, as used herein, terms such as "right", "left", "vertical", "horizontal", "top", "bottom", "upper", "lower", "under", "below", "underlying", "over", "overlying", "parallel", "perpendicular", etc., are intended to describe relative locations as they are oriented and illustrated in the drawings (unless otherwise indicated) and terms such as "touching", "on", "in direct contact", "abutting", "directly adjacent to", etc., are intended to indicate that at least one element physically contacts another element (without other elements separating the described elements). The corresponding structures, materials, acts, and equivalents of all means or step plus function elements in the claims below are intended to include any structure, material, or act for performing the function in combination with other claimed elements as specifically claimed.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Therefore, disclosed above are optoelectronic integrated circuit structures that incorporate a first optical waveguide, having a semiconductor core, indirectly coupled to a grating coupler through a second optical waveguide, having a dielectric core, in order provide a relatively large alignment tolerance. The dielectric core can comprise multiple dielectric layers above one end of the semiconductor core and extending laterally over an isolation region adjacent to that end. The grating coupler can include dielectric fins above the isolation region. Alternatively, the grating coupler can include semiconductor fins within the isolation region. Also disclosed herein are methods of forming such optoelectronic integrated circuit structures that can be readily integrated with complementary metal oxide semiconductor (CMOS) device processing and germanium photodetector processing.

What is claimed is:

1. An optoelectronic integrated circuit structure comprising:
    an insulator layer;
    a semiconductor core of a first optical waveguide on said insulator layer;
    an isolation region on said insulator layer laterally surrounding said semiconductor core, said isolation region comprising a first dielectric material;
    a dielectric core of a second optical waveguide, said dielectric core comprising:
        at least one layer of a second dielectric material, said second dielectric material being different from said first dielectric material and said at least one layer of said second dielectric material having a first section above an end of said semiconductor core and a second section above said isolation region; and,
        a stack of dielectric layers above said first section and extending laterally onto said second section; and,
    a grating coupler comprising multiple dielectric fins above said second section and positioned laterally adjacent to said stack, said dielectric fins being perpendicularly oriented relative to said stack and said end of said semiconductor core, said stack and each of said dielectric fins comprising a layer of said first dielectric material and additional layers of said second dielectric material above said layer of said first dielectric material.

2. The optoelectronic integrated circuit structure of claim 1, said semiconductor core comprising silicon, said first dielectric material comprising silicon dioxide and said second dielectric material comprising silicon nitride.

3. The optoelectronic integrated circuit structure of claim 1, said additional layers of said second dielectric material comprising four additional layers of said second dielectric material, and said optoelectronic integrated circuit structure further comprising a blanket layer of a third dielectric material over said stack and said dielectric fins, said third dielectric material being different from said first dielectric material and said second dielectric material.

4. The optoelectronic integrated circuit structure of claim 1, said additional layers of said second dielectric material comprising two additional layers of said second dielectric material, said dielectric core further comprising a portion of at least one conformal layer of said second dielectric material that covers said stack, said at least one conformal layer of said second dielectric material further covering said dielectric fins, and said optoelectronic integrated circuit structure further comprising a blanket layer of a third dielectric material on said at least one conformal layer of said second dielectric material, said third dielectric material being different from said first dielectric material and said second dielectric material.

5. The optoelectronic integrated circuit structure of claim 1, wherein at least one of said end of said semiconductor core and an adjacent end of said dielectric core is tapered.

6. The optoelectronic integrated circuit structure of claim 1, further comprising a signal propagation termination region comprising a trench that extends vertically through said stack to said at least one layer of said second dielectric material, said trench being filled with a third dielectric material that is different from said first dielectric material and said second dielectric material.

7. An optoelectronic integrated circuit structure comprising:
an insulator layer;
a semiconductor core of a first optical waveguide on said insulator layer;
a grating coupler on said insulator layer adjacent to an end of said semiconductor core, said grating coupler comprising multiple semiconductor fins that are perpendicularly oriented relative to said end of said semiconductor core and that are shorter than said semiconductor core;
an isolation region on said insulator layer laterally surrounding said semiconductor core and each of said fins and further covering said fins, said isolation region comprising a first dielectric material;
a dielectric core of a second optical waveguide, said dielectric core comprising multiple dielectric layers above said end of said semiconductor core and extending laterally over said isolation region and said semiconductor fins within said isolation region, said multiple dielectric layers comprising:
at least one layer of a second dielectric material different from said first dielectric material;
a layer of said first dielectric material above said at least one layer of said second dielectric material; and,
additional layers of said second dielectric material above said layer of said first dielectric material.

8. The optoelectronic integrated circuit structure of claim 7, said semiconductor core comprising silicon, said first dielectric material comprising silicon dioxide and said second dielectric material comprising silicon nitride.

9. The optoelectronic integrated circuit structure of claim 7, said additional layers of said second dielectric material comprising at least two additional layers of said second dielectric material, and said optoelectronic integrated circuit structure further comprising a blanket layer of a third dielectric material over said multiple dielectric layers, said third dielectric material being different from said first dielectric material and said second dielectric material.

10. The optoelectronic integrated circuit structure of claim 7, wherein at least one of said end of said semiconductor core and an adjacent end of said dielectric core is tapered.

11. The optoelectronic integrated circuit structure of claim 7, further comprising a signal propagation termination region comprising a trench that extends vertically through said multiple dielectric layers to said at least one layer of said second dielectric material, said trench being filled with a third dielectric material that is different from said first dielectric material and said second dielectric material.

12. A method of forming an optoelectronic integrated circuit structure, said method comprising:
forming an opening in at least one protective layer so as to expose an end of a semiconductor core for a first optical waveguide and an isolation region adjacent to said end, said isolation region comprising a first dielectric material;
depositing multiple dielectric layers over said at least one protective layer and in said opening, said multiple dielectric layers comprising:
at least one layer of a second dielectric material, said second dielectric material being different from said first dielectric material and said at least one layer of said second dielectric material having a first section above said end of said semiconductor core and a second section above said isolation region;
a layer of said first dielectric material on said at least one layer of said second dielectric material; and,
additional layers of said second dielectric material on said layer of said first dielectric material; and,
forming a trench in said multiple dielectric layers within said opening such that said trench extends vertically to said at least one layer of said second dielectric material, such that said trench defines, for a dielectric core of a second optical waveguide, a stack of dielectric layers above said first section and extending laterally onto said second section and such that said trench further defines, for a grating coupler, multiple dielectric fins above said second section and positioned laterally adjacent to said stack, said multiple dielectric fins being essentially perpendicularly oriented relative to said stack and said end of said semiconductor core.

13. The method of claim 12, said semiconductor core comprising silicon, said first dielectric material comprising silicon dioxide and said second dielectric material comprising silicon nitride.

14. The method of claim 12, said additional layers of said second dielectric material comprising four additional layers of said second dielectric material.

15. The method of claim 12, further comprising:
during said forming of said trench, forming an additional trench within said opening that extends vertically through said stack to said at least one layer of said second dielectric material and that defines an outer boundary of said second optical waveguide; and,
after said forming of said trench and said additional trench, forming a blanket layer of a third dielectric material over said stack and said dielectric fins, said third dielectric material being different from said first dielectric material and said second dielectric material.

16. The method of claim 12, wherein at least one of said end of said semiconductor core and an adjacent end of said dielectric core is tapered.

17. A method of forming an optoelectronic integrated circuit structure, said method comprising:
forming an opening in at least one protective layer so as to expose an end of a semiconductor core for a first optical waveguide and an isolation region adjacent to said end, said isolation region comprising a first dielectric material;
depositing multiple dielectric layers over said at least one protective layer and in said opening, said multiple dielectric layers comprising:
at least one layer of a second dielectric material for a dielectric core of a second optical waveguide, said second dielectric material being different from said first dielectric material and said at least one layer of said second dielectric material having a first section above said end of said semiconductor core and a second section above said isolation region;
a layer of said first dielectric material on said at least one layer of said second dielectric material; and,
additional layers of said second dielectric material on said layer of said first dielectric material;
forming a trench in said multiple dielectric layers within said opening such that said trench extends vertically to said at least one layer of said second dielectric material, such that said trench defines, for a dielectric core of a second optical waveguide, a stack of dielectric layers above said first section and extending laterally onto said second section, and such that said trench further defines, for a grating coupler, multiple dielectric fins above said second section and position laterally adjacent to said stack, said multiple dielectric fins being essentially perpendicularly oriented relative to said stack and said end of said semiconductor core;

forming at least one conformal layer of said second dielectric material over said stack and said dielectric fins; and, forming a blanket layer of a third dielectric material on said at least one conformal layer of said second dielectric material, said third dielectric material being different than said first dielectric material and said second dielectric material.

18. The method of claim 17, said semiconductor core comprising silicon, said first dielectric material comprising silicon dioxide and said second dielectric material comprising silicon nitride.

19. The method of claim 17, said additional layers of said second dielectric material comprising two additional layers of said second dielectric material.

20. The method of claim 17, further comprising: after said forming of said at least one conformal layer of said second dielectric material and before said forming of said blanket layer of said third dielectric material, forming an additional trench that is within said opening, that extends vertically through said stack to said at least one layer of said second dielectric material and that defines an outer boundary of said second optical waveguide.

21. The method of claim 17, wherein at least one of said end of said semiconductor core and an adjacent end of said dielectric core is tapered.

22. A method of forming an optoelectronic integrated circuit structure comprising:

forming, from a semiconductor layer on an insulator layer, a semiconductor core of a first optical waveguide and multiple semiconductor fins of a grating coupler, said semiconductor fins being perpendicularly oriented relative to an end of said semiconductor core, and said semiconductor fins being shorter than said semiconductor core;

forming an isolation region that laterally surrounds said semiconductor core and said semiconductor fins and further covers said semiconductor fins, said isolation region comprising a first dielectric material;

forming at least one protective layer above said semiconductor core and said isolation region;

forming an opening in said at least one protective layer so as to expose an end of said semiconductor core and a portion of said isolation region adjacent to said end containing said semiconductor fins; and, forming, in said opening, multiple dielectric layers for a dielectric core of a second optical waveguide, said multiple dielectric layers being on said end of said semiconductor core and extending laterally onto said portion of said isolation region and said multiple dielectric layers comprising:

at least one layer of a second dielectric material different from said first dielectric material;

a layer of said first dielectric material on said at least one layer of said second dielectric material; and, additional layers of said second dielectric material on said layer of said first dielectric material.

23. The method of claim 22, said semiconductor layer comprising silicon, said first dielectric material comprising silicon dioxide and said second dielectric material comprising silicon nitride.

24. The method of claim 22, further comprising:

forming a trench that is within said opening, that extends vertically to said at least one layer of said second dielectric material, and that defines an outer boundary of said second optical waveguide; and, after said forming of said trench, forming a blanket layer of a third dielectric material over said multiple dielectric layers, said third dielectric material being different from said first dielectric material and said second dielectric material.

25. The method of claim 22, wherein at least one of said end of said semiconductor core and an adjacent end of said dielectric core is tapered.

\* \* \* \* \*